United States Patent [19]
Cochran

[11] Patent Number: 5,995,979
[45] Date of Patent: Nov. 30, 1999

[54] APPARATUS AND METHOD FOR SELECTING RECORDS FROM A COMPUTER DATABASE BY REPEATEDLY DISPLAYING SEARCH TERMS FROM MULTIPLE LIST IDENTIFIERS BEFORE EITHER A LIST IDENTIFIER OR A SEARCH TERM IS SELECTED

[76] Inventor: Nancy Pauline Cochran, 52 Gedney St., Nyack, N.Y. 10960

[21] Appl. No.: 09/021,374

[22] Filed: Feb. 10, 1998

Related U.S. Application Data

[63] Continuation of application No. 08/643,942, May 7, 1996, Pat. No. 5,768,581.

[51] Int. Cl.⁶ ..................................................... G06F 17/30
[52] U.S. Cl. .................................. 707/104; 707/3; 707/4; 707/102
[58] Field of Search .................................... 707/104, 102, 707/3, 4

[56] References Cited

U.S. PATENT DOCUMENTS

| | | | |
|---|---|---|---|
| 4,879,648 | 11/1989 | Cochran et al. | 364/300 |
| 5,206,949 | 4/1993 | Cochran et al. | 395/600 |

(List continued on next page.)

FOREIGN PATENT DOCUMENTS

| | | |
|---|---|---|
| WO 96/15501 | 5/1996 | WIPO . |
| WO 96/34350 | 10/1996 | WIPO . |
| WO 97/19415 | 5/1997 | WIPO . |

OTHER PUBLICATIONS

W. Andrews, Better Searching, In (Not) So Many Words, Web Week pp. 29, 31, Jun. 3, 1996.

M. Brandel, On–Line Catalogs Are Booting Up, http://www.computerworld.com/960429ECSL9604ecb.html, printed Jun. 14, 1996, pp.1.

Saqqara in the News, http://www.saqqara.com/whats new/news.html, printed Jul. 9, 1996, pp. 1.

Saqqara Offers Step Search (TM) Pilot Project Program As First Step To Interactive Online Catalog Marketing, http://www.saqqara.com/whats _new/PR121195.html, pp. 1–2; printed Jul. 9, 1996.

SBT and Saqqara Provide Complete Internet Commerce Solution, http://www.saqqara.com/whats new/pr043096.html, pp. 1–2; printed Jul. 9, 1996.

Step SearchTM Internet Catalog Publishing Tool Now Available http://www.saqqara.com/whats new/pr032596.html, pps 1,2; printed Jul. 9, 1996.

Step SearchTM Delivers a Foundation for Internet Commerce http://www.saqqara.com.whats _new/pr download.html, pp. 1–2, printed Jul. 9, 1996.

(List continued on next page.)

*Primary Examiner*—Wayne Amsbury
*Assistant Examiner*—Cheryl Lewis
*Attorney, Agent, or Firm*—Jacobson, Price, Holman & Stern, PLLC

[57] ABSTRACT

A method for managing the presentation of search terms on a computer terminal or other display device so that large computer databases can be searched efficiently. Multiple lists of search terms, such as words, symbols or phrases, are displayed adjacent to list-identifiers (also referred to as index names or indexes). The search terms contained in the lists are only those terms that are actually available in the database. A search of the database is conducted based upon selected search terms from at least one of the multiple lists. The subset of records identified by the search is used to form new lists of search terms that are then displayed on the display device. The user may examine the new subset of search terms and either view one or all of the records located, further limit the search, or reset all or part of the search. The present invention saves computer resources, especially on-line transmission resources, and makes searching more accurate and user-friendly.

9 Claims, 20 Drawing Sheets

U.S. PATENT DOCUMENTS

| | | | |
|---|---|---|---|
| 5,386,503 | 1/1995 | Staggs et al. | 395/157 |
| 5,408,600 | 4/1995 | Garfinkel et al. | 395/153 |
| 5,412,774 | 5/1995 | Agrawal et al. | 395/157 |
| 5,414,809 | 5/1995 | Hogan et al. | 395/155 |
| 5,426,781 | 6/1995 | Kaplan et al. | 395/600 |
| 5,428,731 | 6/1995 | Powers, III | 395/154 |
| 5,444,841 | 8/1995 | Glaser et al. | 395/149 |
| 5,446,880 | 8/1995 | Balgeman et al. | 395/600 |
| 5,530,852 | 6/1996 | Meske, Jr. et al. | 395/600 |
| 5,715,444 | 2/1998 | Danish et al. | 707/4 |

OTHER PUBLICATIONS

Step Search Catalog at AMP Pioneers Electronic Commerce on the Web, http:/www.saqqara.com.whats new/ampannounce.html, p. 1, printed Jul. 9, 1996.

Step SearchTM Creates Dynamic Catalogs and Speeds Information Delivery to the World Wide Web, http://www.saqqara.com/whats_new/PR101695.html, pp. 1–2, printed Jul. 9, 1996.

What's New, Press Releases, http://www.saqqara.com/whats new/, pp. 1–2, printed Jul. 9, 1996.

New and Noteworthy, http://www.computerworld.com/9602/960205S Lecnew.html, pp. 1–2, printed Jul. 9, 1996.

New and Noteworthy, Computerword, Feb. 5, 1996 pp. 80.

Mary Brandel, On–Line Catalogs are Booting Up, Computerworld Electronic Commerce Journal, Apr. 29, 1996, pp 5.

Obraczka, Danzig, and Li, "Internet Resource Discovery Services", vol. 26, No. 9, pp. 8–22, Sep. 1993.

FIG. 4c

```
[Travel Search Database]

[First] [Next] [Previous] [Last]

NAME - Quality Inn

ADDRESS - 3033 Hilton Drive, Bossier City, LA
PHONE - (318) 747-2400 or (800) 221-2222

Outdoor pool. Entertainment/dancing. 2 Lounges. Restaurant. Coffee shop. Near
Pierre Bossier Mall & Louisiana Downs Daily rates for 1-2 Beds range from $50 to $70
SIZE: 245 Accommodations
8 Meeting Rooms accommodating groups of 75 to 600
LOCATIONS: Off I-20 at Airline Drive Exit, near downtown
NEARBY CITIES:
Shreveport, LA 2 miles
Longview, TX 61 miles
NEARBY AIRPORTS:
```

FIG. 4d

```
[Travel Search Database]

Travel Search Database - Selection Screen

1. Start of Travel:....... January-March
2. Number of People: Disregard Occupancy
3. Location:............... Within a Region, Atlantic States: DE,DC,MD,PA,NJ,VA,WV
114 — 4. Lodging Type....... Hotel/Motel                    [Search]
       5. Lodging Name...... Hotel/Motel                    [Search]
                            Waterfront
       6. Amenities..........  Suite Hotel                  [Search]
       7. Price...............  Inn or Country Lodge
                            Dude Ranch
       Number Found: 1308 Beach Resort
                            Ski Resort
       [View All] [View O Health Resort or Spa         ... Help ...
                            Tennis Resort
                            Golf Resort
                            Social Activities Resort
```

FIG. 5b

```
┌─────────────────────[Travel Search Database]──────────────────▽│△─┐
│                                                                 △│
│ Travel Search Database - Selection Screen                        │
│                                                                  │
│ 1. Start of Travel:........ January-March                        │
│ 2. Number of People:  Disregard Occupancy                        │
│ 3. Location:.............. Within a State, Delaware              │
│ 4. Lodging Type........ [Hotel/Motel           ▽] [Search]       │
│ 5. Lodging Name....... [Addy Sea               ▽] [Search]       │
│ 6. Amenities.............. [Outdoor Swimming   ▽] [Search]       │
│ 7. Price.................... [Economy          ▽] [Search]       │
│                                                                  │
│ ...Number Found: 26                                              │
│   [View All] [View One] [Reset 4-7] [Start Over]  ... Help ...   │
│      /          /          /           /                         │
│     121        122        123         124                        │
│                                                                 ▽│
└──────────────────────────────────────────────────────────────────┘
```

FIG. 5c

```
┌─────────────────────[Travel Search Database]──────────────────▽│△─┐
│                                                                 △│
│ Travel Search Database - Selection Screen                        │
│                                                                  │
│ 1. Start of Travel:........ January-March                        │
│ 2. Number of People:  Disregard Occupancy                        │
│ 3. Location:.............. Within a State, Delaware              │
│ 4. Lodging Type........ [Hotel/Motel           ▽] [Search]       │
│ 5. Lodging Name....... [Hotel/Motel            ▽] [Search]       │
│                        [Waterfront              ]                │
│ 6. Amenities.............. [Inn or Country Lodge ] [Search]      │
│ 7. Price.................... [Economy          ▽] [Search]       │
│                                                                  │
│ ...Number Found: 26                                              │
│   [View All] [View One] [Reset 4-7] [Start Over]  ... Help ...   │
│                                                                 ▽│
└──────────────────────────────────────────────────────────────────┘
```

FIG. 5f

```
Travel Search Database - Selection Screen
                   Economy
1. Start of Travel:...... Luxury Price
2. Number of People:    $30 or less     ncy
3. Location:............  $25 - $50      laware
4. Lodging Type.......   $40 - $70              [▽] [ Search ]
5. Lodging Name......    $60 - $90              [▽] [ Search ]
6. Amenities............  $80 - $150   g        [▽] [ Search ]
7. Price...............   $180 and up
                          Economy       [▽]     [ Search ]

...Number Found: 26

[ View All ] [ View One ] [ Reset 4-7 ] [ Start Over ]  ... Help ...
```

FIG. 6a

```
Travel Search Database - Selection Screen

1. Start of Travel:......  January-March
2. Number of People:      Disregard Occupancy
3. Location:............   Within a City
.. City Name: [                 ] (Type 1 or more letters & Enter..) [ Enter ]
4. Lodging Type.......              |                                    |
5. Lodging Name......              600                                  610
6. Amenities............
7. Price...............
```

FIG. 6b

```
Travel Search Database - Selection Screen

1. Start of Travel:......  January-March
2. Number of People:  Disregard Occupancy
3. Location:...........  Within a City
.. City Name: [bos    ]  (Type 1 or more letters & Enter..) [Enter]
4. Lodging Type......         |                                |
5. Lodging Name......        600                              610
6. Amenities...........
7. Price...................
```

FIG. 6c

```
Travel Search Database - Selection Screen

1. Start of Travel:......  January-March
2. Number of People:  Disregard Occupancy
3. Location:...........  Within a City
   [Bossier City, LA ▽] [Search]——500
   [Bossier City, LA   ]
   [Boston, MA         ]

6. Amenities...........
7. Price...................
```

FIG. 7a

```
                    [Travel Search Database]

Travel Search Database - Selection Screen

1. Start of Travel:...... January-March         314
    2. Number of People:  Disregard Occupancy
    3. Location:............. Within a City, Bossier City, LA
114 — 4. Lodging Type....... [Hotel/Motel       |▼] [Search]  — 315
115 — 5. Lodging Name...... [Airline Motor Inn |▼] [Search]
116 — 6. Amenities............. [Outdoor Swimming |▼] [Search]
117 — 7. Price..................... [Economy          |▼] [Search]  — 316
118 — ...Number Found: 10                        — 317

[View All] [View One] [Reset 4-7] [Start Over] ... Help ...
```

FIG. 7b

```
                    [Travel Search Database]

Travel Search Database - Selection Screen

1. Start of Travel:...... January-March
    2. Number of People:  Disregard Occupancy
    3. Location:............. Within a City, Bossier City, LA
    4. Lodging Type....... [Hotel/Motel       |▼] [Search]
    5. Lodging Name...... [Hotel/Motel        |▼] [Search]
                          [Suite Hotel       ]
    6. Amenities............. [Outdoor Swimming |▼] [Search]
    7. Price..................... [Economy          |▼] [Search]

...Number Found: 10

[View All] [View One] [Reset 4-7] [Start Over] ... Help ...
```

FIG. 7c

Travel Search Database - Selection Screen

1. Start of Travel:...... January-March
2. Number of People: Disregard Occupancy
3. Location:............... Within a City, Bossier City, LA
4. Lodging Type....... Hotel/Motel ▼ [Search]
5. Lodging Name...... Airline Motor Inn ▼ [Search]
6. Amenities............. Airline Motor Inn ▼ [Search]
   Best Western
7. Price..................... Days Inn
   La Quinta Inn
...Number Found: 10  Motel 6
[View All] [View O  Palace Inn      ...Help...
   Quality Inn
   Ramada Inn
   Residence Inn
   Sheraton Inn

FIG. 7d

Travel Search Database - Selection Screen

1. Start of Travel:...... January-March
2. Number of People: Disregard Occupancy
3. Location:............... Within a City, Bossier City, LA
4. Lodging Type....... Hotel/Motel ▼ [Search]
5. Lodging Name...... Airline Motor Inn ▼ [Search]
6. Amenities............. Outdoor Swimming ▼ [Search]
7. Price..................... Outdoor Swimming
   Workout Room
...Number Found: 10  Sauna
[View All] [View One] [Reset 4-7] [Start Over]  ...Help...

FIG. 7e

Travel Search Database - Selection Screen

1. Start of Travel:....... January-March
2. Number of People: Disregard Occupancy
3. Location:............... Within a City, Bossier City, LA
4. Lodging Type....... [Hotel/Motel ▽] [Search] —134
5. Lodging Name...... [Airline Motor Inn ▽] [Search] —135
6. Amenities............. [Outdoor Swimming ▽] [Search] —136
7. Price.................... [Economy ▽] [Search] —137

Economy
   Economy
...Number Found: 10  $30 or less
[View All] [View O] $25 - $50  [rt Over] ... Help ...
   $40 - $70
   $60 - $90
   $80 - $150

FIG. 8a

Travel Search Database - Selection Screen

1. Start of Travel:....... January-March
2. Number of People: Disregard Occupancy
3. Location:............... Within a City, Boston, MA
4. Lodging Type....... [Hotel/Motel ▽] [Search]
5. Lodging Name...... [Best Western ▽] [Search]
6. Amenities............. [Outdoor Swimming ▽] [Search]
7. Price.................... [Economy ▽] [Search]

...Number Found: 73
[View All] [View One] [Reset 4-7] [Start Over] ... Help ...

FIG. 8b

```
[Travel Search Database]

Travel Search Database - Selection Screen

1. Start of Travel:...... January-March
2. Number of People: Disregard Occupancy
3. Location:............. Within a City, Boston, MA
4. Lodging Type....... [Hotel/Motel          ▽] [Search]
5. Lodging Name...... [Hotel/Motel          ▽] [Search]
                      [Waterfront            ]
6. Amenities............ [Suite Hotel         ] [Search]
7. Price................. [Inn or Country Lodge]
...Number Found: 73   [Golf Resort          ]

[View All] [View One] [Reset 4-7] [Start Over]  ...Help...
```

FIG. 8c

```
                    Midtown Hotel
                    Milner Hotel
Travel Search Databa Motel 6
                    Omni Hotel
1. Start of Travel:..... Park Plaza Hotel & Tower
2. Number of People: Parker House
3. Location:............. Plaza Towers
4. Lodging Type....... Quality Inn               [Search]
5. Lodging Name...... Ramada Hotel
                    Red Roof Inn              [Search]
6. Amenities............ Ritz-Carlton              arch
7. Price................. Sheraton Hotel
                    Sheraton Inn
...Number Found: 73 Sheraton Towers
[View All] [View O  Sonesta Hotel           ...Help...
                    Susse Chalet
                    TLC Hotel
                    TravelLodge
                    Wellesley Inn on Square
                    Westin Hotel
```

FIG. 9a

[Travel Search Database]

Travel Search Database - Selection Screen

1. Start of Travel:....... January-March
2. Number of People: Disregard Occupancy
3. Location:................ Within a City, Boston, MA
4. Lodging Type....... [Hotel/Motel ▽] [Search]
5. Lodging Name...... [Comfort Inn ▽] [Search]
6. Amenities............. [Outdoor Swimming ▽] [Search]
7. Price...................... Economy ...Number Found: 13

[View All] [View One] [Reset 4-7] [Start Over] ... Help ...

FIG. 9b

[Travel Search Database]

Travel Search Database - Selection Screen

1. Start of Travel:....... January-March
2. Number of People: Disregard Occupancy
3. Location:................ Within a City, Boston, MA
4. Lodging Type....... [Hotel/Motel ▽] [Search]
5. Lodging Name...... [Hotel/Motel ▽] [Search]
6. Amenities............. [Outdoor Swimming ▽] [Search]
7. Price...................... Economy ...Number Found: 13

[View All] [View One] [Reset 4-7] [Start Over] ... Help ...

FIG. 10a

| State Name | City Name | Hotel Name | Price |
|---|---|---|---|
| Alabama | Alantown | Airline Motel | Economy |
| Arkansas | Ambrose | Beckley Inn | Luxury |
| Arizona | Amity | Best Western | $30 or less |
| California | Antoine | Bristol Hotel | $25 - $50 |
| Colorado | Appleton | Bryce Resort | $40 - $70 |
| Connecticut | Arkinda | Cedar Inn | $60 - $90 |
| Delaware | Ashclown | Cannon Motel | $80 - $150 |
| Florida | Asher | Canterbury | $140 - $200 |
| Georgia | Atkins | Capitol Hill | $180 and up |

[Search]

FIG. 10b

[Travel Search Database]

Lodging

Alabama ▼ [Search]

Alantown ▼ [Search]

Airline Motor Inn ▼ [Search]

Economy ▼ [Search]

APPARATUS AND METHOD FOR SELECTING RECORDS FROM A COMPUTER DATABASE BY REPEATEDLY DISPLAYING SEARCH TERMS FROM MULTIPLE LIST IDENTIFIERS BEFORE EITHER A LIST IDENTIFIER OR A SEARCH TERM IS SELECTED

This is a continuation of application Ser. No. 08/643,942 filed May 7, 1996, now U.S. Pat. No. 5,768,581.

BACKGROUND OF THE INVENTION

1. Field of the Invention

The present invention relates to a method for accessing records from a computer database. More specifically, the present invention relates to a method for accessing records from a computer database by first displaying a plurality of lists of search terms available in the database.

2. Description of the Related Art

A computer database is a collection of information stored in a computer-readable medium. The information is usually associated with a common theme or subject. Information is stored in the database as a collection of records, each record having multiple fields (also referred to as indexes or list identifiers) containing the data or information. For instance, a database may be a phone directory, with each record consisting of the fields Name, Address, Home Phone, Work Phone, and so forth.

A database may be searched by specifying the desired information sought as a "search term". A searcher may further specify whether the search term is to be limited to a given field, or all fields. Additionally, the user may combine search terms with boolean logic or similar code terms to form a search string. The search system will search through all records in the database for information matching the specified search term or string selected.

World Wide Web Pages or Sites are specific addressable locations on the Internet that provide information to a remote user or operator. A Web Site may be associated with a particular database that can be searched by the user. In this manner, the Web Site acts as an interface for the user to access information stored in the computer database.

Searching information on the World Wide Web is confusing since search systems vary from Web Site to Web Site. Often, a Web Site will provide detailed instructions on how to use their search system. However, these instructions can be lengthy and confusing, often going unread and turning away otherwise potential database users.

Untrained and relatively inexperienced new information users have even more difficulty than experienced users in focusing their on-line searches. New users have trouble knowing what terms are used to designate a field or listing on a particular database. Moreover, new users will not know how to distinguish among a large number of very similar names and listings.

The amount of information available over electronic media is increasing astronomically. The World Wide Web, grew 10% a month for more than a year during 1994 and 1995. In June, 1993 there were 130 Web sites; in June, 1995 there were 23,500. The use of private networks is increasing even faster. Commercially available databases, such as WESTLAW® and LEXIS®, are also growing in popularity and volume of stored information.

The increased amount of information makes it more time consuming and more difficult to accurately focus database searches and find data that is needed. Increasingly, even experienced database users have problems selecting the best information from the large quantity of complex, overlapping, misspelled and interrelated information that is available.

The number of people accessing on-line information sources is also increasing at a very rapid rate. Analysts estimate that, at the end of 1955, more than 3 million people accessed the Internet's World Wide Web directly and 6.3 million more accessed the World Wide Web using commercial on-line services such as "COMPUSERVE"® or "AMERICA ON-LINE"®.

Because of the increased amount of data available in databases, and the increased number of people accessing databases, transmission resources often cannot keep up with the expanding demands. Consequently, transmission resources are often strained to capacity. It is well known that the lack of available band width to carry all the data being transmitted periodically slows transmissions over services like the Internet. Increasing volume is likely to slow transmission even more in the future unless the selection of information is more precise and more closely tied to the exact expectation and the needs of users.

Search systems in use today are sometimes inefficient and difficult to use. Most search systems permit the user to input a single term, or a string of terms connected by boolean logic. The user may include code language in order to limit the search to a predefined field. These systems are difficult to use since they require a knowledge of the field codes specific to that system. Moreover, the user may waste resource time by selecting search terms that are not contained in the database.

Other database search systems provide a single hierarchical arrangement of choices. For example, in selecting a particular kind of merchandise from a database of products that are for sale, a user may be presented a decision hierarchy organized first by brand names and then by price. If the merchandize is midsized automobiles, for instance, the user may initially select amongst a list of manufacture and model names. After making a decision about a manufacture and model, the decision-tree would then allow the user to select a price. After selecting a price, the system might finally allow the user to see more detail about the vehicles selected.

In general, these types of single-hierarchal searching arrangements work well. However, decision-making processes having a single hierarchical arrangement of choices do not adequately serve the needs of all users. For instance, in the example above, if the manufacturers' names and models are not known to the user, or if the price spread is very large, the user may have preferred to start with price. In terms of search technology, it would have been just as logical to look at midsized automobiles by price first, and later select a manufacturer and model. Nevertheless, single-hierarchal systems require the user to select from a first category, such as Manufacturer, before being able to view search terms under a second category, such as Price.

In a second example of a hierarchal decision system, a general information database on the World Wide Web might present the following main categories:

Arts
Business & Economics
Culture
Education
Entertainment

Government

Health

Recreation

Science

A user will be expected to select one of these categories in order to proceed. However, if a user is looking for information about, say, Meditation, it might not be obvious to the user whether they should start with Health or Culture. If they select Health, they may find choices that include:

Diseases

Emergency Services

Insurance

Mental Health

Pharmacology

Treatments

At this point the user may be inclined to go back to the original menu and look at Culture to see if the next level of selection in that index offers a better choice. After looking at the Culture category, if there is no better choice, the user may come back to Health and select Treatment, in order to proceed. If that decision does not lead to wanted information, the user may consider going back again and trying the Education category in the main menu.

The typical single-hierarchal search system does not permit the user to look at the topics under the category, Health, compare the Health topics to the topics under the categories, Culture and Education, and make decisions of how to proceed based upon what they have learned. Consequently, the search system is highly inefficient, reduces the likelihood of a successful database search, and increases the amount of time a user spends in the search system. Often, a user will proceed with a decision path, only to later realize that a wrong choice was made several decisions back. The user will be forced to back-track or re-start the search from the beginning.

One specific type of search system is disclosed in U.S. Pat. No. 5,206,949 to Cochran, et al. entitled "Database Search and Record Retrieval System which Continuously Displays Category Names During Scrolling and Selection of Individually Displayed Search Terms" and U.S. Pat. No. 4,879,648 to Cochran, et al. entitled "Search System which Continuously Displays Search Terms During Scrolling and Selections of Individually Displayed Data Sets".

In the Cochran, et al. systems, selections are hierarchical. The order in which categories can be displayed is predetermined. The user then scrolls through a list of search terms associated with a first predetermined category to be searched and selects the desired search term. Once a search term is selected, a search of the database is conducted. The result of the search is used to update the list of search terms that are then available for the next category.

With reference to the first example above, the Cochran et al. systems require the user to first select and search a search term from the category Manufacturer. Once the search term for Manufacturer has been selected and the search performed, the user will then be required to select and search a search term from the next category Price. The list of search terms available under the category Price will differ depending upon the Manufacturer Name and Model that was originally selected.

The Cochran, et al. systems have the same disadvantages as other single-hierarchal systems. In addition, in Cochran, et al., only a single search term from a list of search terms may be viewed at a time. Consequently, the user cannot simultaneously view all of the various search terms for a given category.

SUMMARY OF THE INVENTION

Accordingly, it is an object of the present invention to reduce the burden on existing transmission resources during computer database searches. It is a further object of the invention to provide an efficient and user-friendly method of searching computer databases. It is yet another object of the present invention to provide a search system that allows a user to view each of the search terms available under more than one list of search terms before selecting a search term.

It is our object of the present invention to provide a search system that efficiently displays information to users that are searching for particular information in a database. The database source is ordinarily at a location different from the location of the display devices, which are computer screens associated with a computer terminal. Information from the database is transmitted over a communication network. The display device is used to help users make decisions that allow them to acquire the most relevant information from a particular source.

It is a particular object of the invention to enable a user to view different lists of choices, or search terms, that are available in a unique search situation. The lists may be viewed prior to making a selection that would otherwise reduce the database to a subset of records. Even when the database is complex, users can see choices in multiple indexes and make fine discriminations that they might not recognize as possible if they had otherwise not been able to view the available choices.

Only choices or search terms that are actually available are presented to the user. Hence, users are never put in the position of failing to find information that meet the criteria they have chosen. Only search terms that will return a "hit" are presented on the display device. Likewise, the user will be informed even of words that are misspelled on the database.

It is further an object of the present invention to provide a search system that permits the user to examine more than one list of choices before a decision of how to proceed is made and that gives information about what is available in a database. The likelihood of a successful database search is thereby significantly increased. In addition, the amount of time spent searching is reduced since the user need not back-track or re-start a search from the beginning.

The invention takes into account the information that is available in the database and the decisions that have already been made by a particular user during a particular search. Because the invention allows the user to make accurate selections efficiently, the invention minimizes the transmission of unwanted or inappropriate information over the network.

Accordingly, it is an object of the present invention to increase the likelihood of obtaining desired information and avoid the transmission of unwanted information. In addition, users will not burden transmission resources with fruitless search requests. In increasing search effectiveness, the present invention significantly reduces the burden on existing transmission resources.

BRIEF DESCRIPTION OF THE DRAWINGS

The subject matter which is regarded as the invention, together with further objects and advantages thereof, may best be understood by reference to the following description taken in conjunction with the accompanying drawings, in which:

FIGS. 4a, 4b, and 4d–4g illustrate a first series of selections made in accordance with the preferred embodiment.

FIG. 4c depicts a record displayed on a display device in accordance with the preferred embodiment.

FIGS. 5a–5f illustrate a second series of selections made in accordance with the preferred embodiment.

FIGS. 6a–6c illustrate a third series of selections made from a selection screen receiving search terms responsive to inputs from the user in accordance with the preferred embodiment.

FIGS. 7a–7e illustrate a fourth series of selections made in accordance with the preferred embodiment.

FIGS. 8a–8e illustrate a fifth series of selections made in accordance with the preferred embodiment.

FIGS. 9a–9d illustrate a sixth series of selections made in accordance with the preferred embodiment.

FIGS. 10a–10b illustrate an alternative embodiment for the presentation of information on a display device of the present invention.

DETAILED DESCRIPTION OF THE PREFERRED EMBODIMENTS

Figure 1:
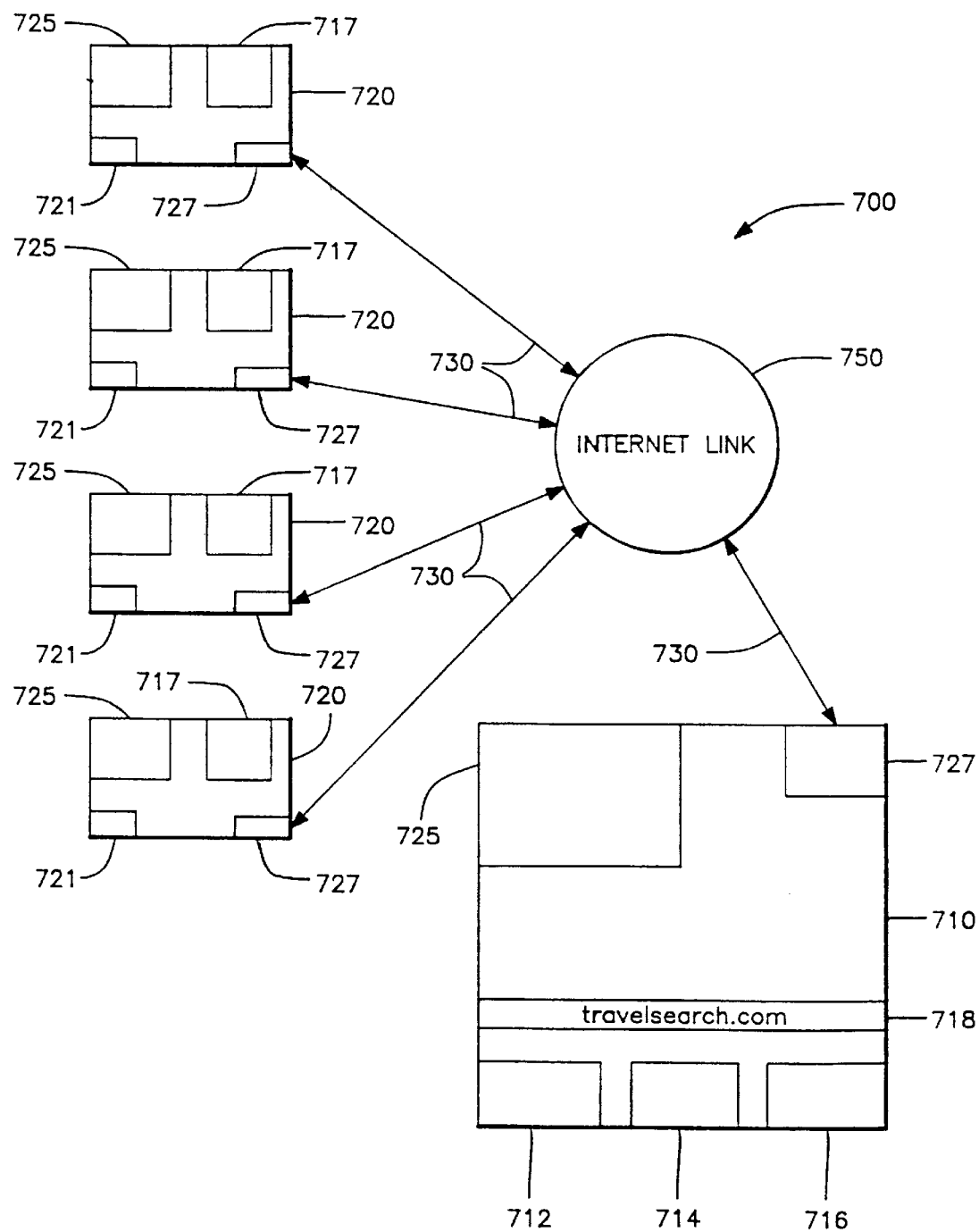
FIG. 1 shows the general configuration of a computer communications network used in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The system and method of the present invention is implemented by computer software which permits the accessing of data from a computer database. The software, as well as the database, the latter of which may be a CD-ROM, may be within a single free-standing computer. Alternatively, the software and database may be in a central computer networked to a group of computers. Preferably, the computer software and database are at a remotely located host server that is accessed through a communication medium such as the Internet.

In the description that follows, "search term" refers to any word, symbol or phrase that can be used to search a database; "list-identifier" refers to any word, symbol, icon or phrase that identifies a category of information that includes a particular group or listing of search terms. Some database systems refer to list-identifiers as a field code. "Database" is a collection of logically related records or files.

The accessing of data from the database in accordance with the software instructions so as to display list identifiers, to access search terms associated with list identifiers, to search the database records following selection of search terms, as will be discussed below, may be done in accordance with the system and method described more fully in the Cochran, et al. '648 and '949 patents, herein incorporated by reference.

FIG. 1 shows a preferred overall implementation of the invention in a computer network 700 in accordance with the preferred embodiment. A plurality of computer terminals 720 are networked to a remotely located server computer 710 via a communications link 750, preferably the Internet. The communications link 750 functions as a communication link between computers 720, which are typically located at an office or home, and remotely located servers 710.

Server 710 includes a processor 729 for implementing the software program of the present invention. Computer terminal 720 includes a processor 721 for implementing software, such as a Web Browser, and instructions received from server 710.

Each computer terminal 720 has memory space 717 and a monitor or display device 725. Computers 720 are coupled to the communication link 750 through a bidirectional communication line 730, such as a telephone line or an Integrated Services Digital Network (ISDN) connection. The communication line 730 is accessed by an associated router or modem 727. Server 710 is coupled to the communication link 750 in a like manner.

In the preferred embodiment, communication link 750 is the Internet. The Internet comprises multiple servers (not shown) that are capable of communicating with each other directly or through other servers. Likewise, computer terminals 720 access server 710 though one or more intermediary servers (not shown) through which the computer terminal 720 normally gains access to the communications link 750. Server 710 may additionally function as the direct connection to the Internet for one or more of computers 720 that are accessing the present invention. Computer terminals 720 and server 710 form part of Internet, in conjunction with communication link 750.

In the preferred embodiment of the invention, the database at server 710 is accessed via a World Wide Web page by a Web Browser. The database 712 is stored at the remote server computer 710 and is associated with a predefined Web Site address 718. The database may be accessed by a plurality of users located at remote computer terminals 720. Server 710 stores the database information 712 as well as the code 714 used to implement the present invention.

In addition, memory space 716 is optionally allocated so that server 710 may retain the status of search requests for individual computers 720. As will be discussed further below, searches for individual computers 720 are distinguished by appending an identification number to each search request. Each search request will result in a subset of records which are then stored or marked at the server 710, in association with that identification number. The subset of records may be stored, or marked and accounted at memory space 716. Search terms derived from the subset of records marked at server 710 are then transmitted to the memory 717 of the computer terminals 720 where the user initiated the search.

Users gain access to the database by using Web Browser software stored at the user's computer 720. The user points the Web Browser to the predefined address. The Web Browser is then guided by http codes 714 stored at the server 710 to implement the invention.

In the preferred embodiment, the search system of the present invention is used to acquire travel information over the Internet and is accessed through a Web Page addressed at "http://travelsearch.com.", herein incorporated by reference. The database, known by the trade name, "TRAVEL SEARCH"™, consists of database records of more than 13,000 hotels, resorts and inns in the United States.

The "TRAVEL SEARCH"™ database is searched using thousands of search terms that have been grouped into seven major indexes or list identifiers. A Web Browser, such as "NETSCAPE"® or "AIR MOSAIC"®, is used to access the designated Web Page. However, any browser may be used, and the search system may be directly integrated with the browser.

Figure 2:
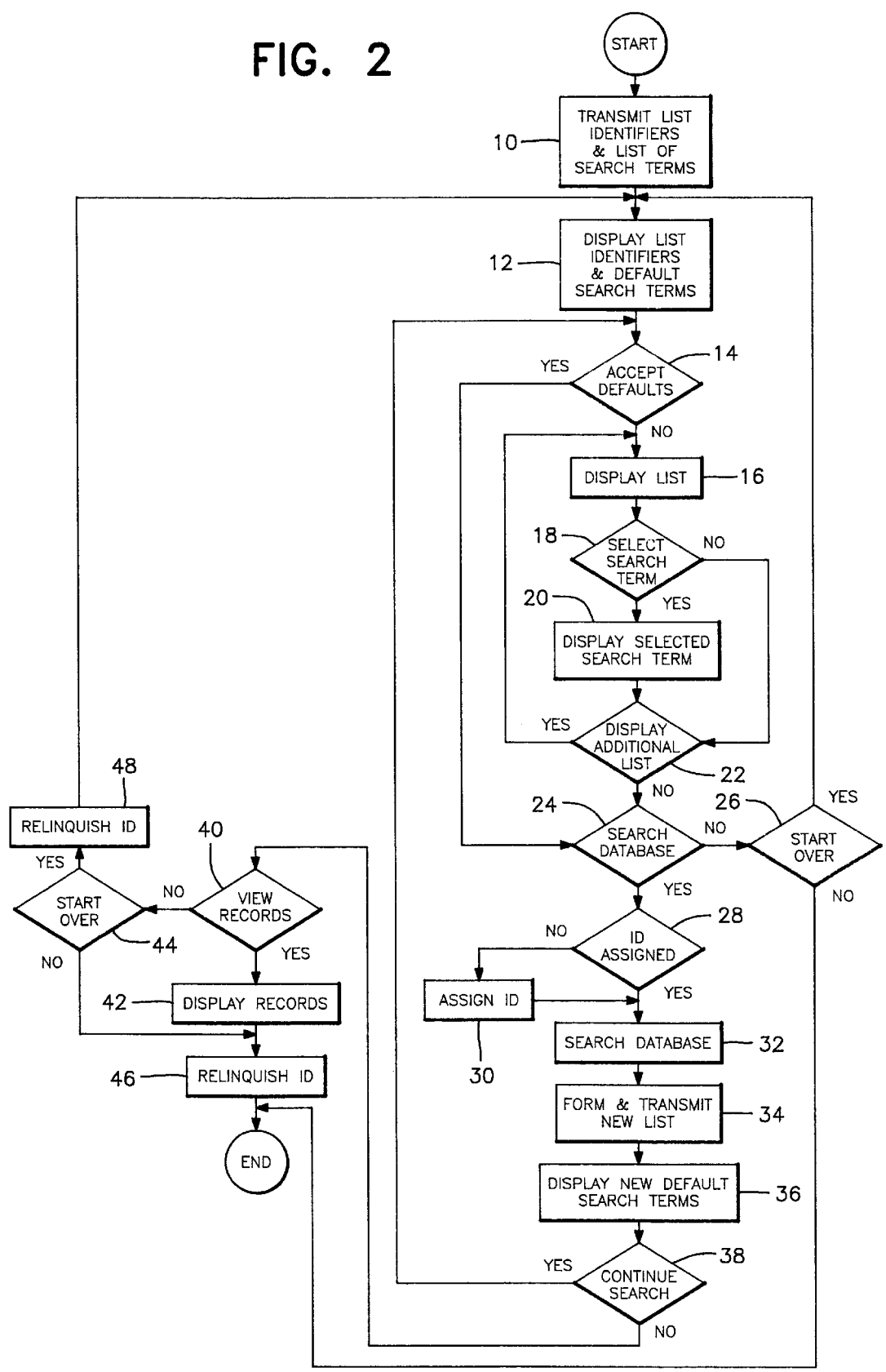
FIG. 2 is a generalized flow chart of a method of selecting records from a computer database in accordance with the present invention.

Now referring to FIG. 2 a generalized overall method of searching a computer database in accordance with the preferred embodiment of the invention is depicted. Specific examples will be discussed in further detail below.

In response to a request by a user at remote computer terminal 720, the server 710 transmits information, at step 10, to the user's computer 720. The request to start the program is made by dialing the address of the remote server 710. The information transmitted from server 710 to the user's computer 720 includes a plurality of list identifiers and lists of search terms associated with those list identifiers. The information is stored in memory 717 of the user's computer 720. At step 12, the plurality of list identifiers are displayed on the user's display device 725.

The list identifiers are terms or phrases identifying the various categories of information that the user may select when formulating a search strategy. For example, and as discussed further below, the list identifiers may be "Start of Travel", "Number of People", "Location", "Lodging Type" and "Lodging Name". The step of providing list identifiers may be accomplished in the same manner as described, for instance, in the Cochran et al. patents, which have been incorporated by reference above.

In addition, default search terms are transmitted by server 710 and displayed adjacent at least one of the list identifiers 12. For instance, the default term "Hotel/Motel" may be displayed adjacent the list identifier "Lodging Type". Unless the user selects a different search term, the default search term will prevail as the selected search term should a search be conducted.

At this point, the user can accept one or a predetermined number of default search terms that are displayed and search the database using those default search terms 24. Alternatively, the user may display the entire list of search terms 16 associated with a list identifier. If the user selects to display a list at step 14, multiple search terms associated with the list identifier are read from the computer's memory 717 and all are displayed at step 16. For example, the user may display the entire list of search terms for the list identifier "Lodging Type". That list may comprise the search terms "Hotel/Motel", "Waterfront", "Ski Resort", "Beach Resort", and so forth.

Once a list of search terms is displayed for a particular list identifier, the user may select one of the multiple search terms displayed 18. If the user displays a list of search terms and selects one of the search terms 18, that search term will be displayed in place of the default search term 20 adjacent list identifier 20. The entire list of search terms will no longer be displayed.

If the user does not select a search term, the default search term will continue to be displayed. Alternatively, if the list had been viewed earlier and a search term had been previously selected, the last selected search term will remain as the selected search term. Thus, if a new search term is not selected, the most previously selected search term will continue to operate as the selected search term 14. The selected search term will be displayed adjacent the list identifier 20. The entire list of search terms identified with that list identifier will no longer be displayed.

At this point, the user may display a list of search terms associated with a different list identifier 22, re-display the search terms associated with the prior list identifier 22, conduct a search 24, end the session ("no" at 26), or start over ("yes" at 26). Accordingly, the user may display each list multiple times before deciding to conduct a search 24. Likewise, the user may view all of the search terms available 16 for each list identifier prior to selecting a first search term 18. Thus, the user may reconsider one or more of the selected search terms once the other available search terms have been viewed.

At step 26, the user may chose to start over and reset the search terms that have been selected so far. If the user chooses to reset the selected search terms, the default search terms will be displayed as the selected search terms 12. The user will again be able to display lists and select new search terms.

Once the user is satisfied with the selected search term, having viewed as many lists of search terms for various list-identifiers as was desired, the user indicates that a search is to be conducted 24. If the user did not select a search term for any of the list identifiers, or even view the complete list of search term, the default search term will be used as the selected search term.

In response to the user electing to conduct a search at step 24, the search query is assigned a unique identification number (ID) 30 if no identification number has been previously assigned 28. The identification number will carry through that user's particular search session.

The identification number is a hidden variable created by the program to identify a particular search sequence. It is created in the same way browsers, such as Netscape® or Mosaic®, create hidden variables to keep track of multiple users. An ID number is attached to the first search in any search sequence and "marks" subsequent searches in the same sequence with the same identification or number until the search is ended.

The identification number enables the server 710 to keep track of the selected search terms, the results obtained and like information. The use of ID numbers makes it possible for multiple users to have searches pending for a single database simultaneously. The identification number may be a random number, a consecutive number, or any other conventional identification code. The identification codes are appended to the search queries and to the subset of records located at the database in conformance with well-known techniques.

The search request is transmitted to the database 710 and then the identification number is appended to the search query at step 30. The database is then searched for records having the selected search terms 32. The matching records, or "hits", are stored or otherwise marked as a subset of records 34 at server 710. Database searching techniques and the identification of subsets are well-known, such as shown by the Cochran, et al. patents which have been incorporated by reference above.

At step 34, the subset of records is examined to create updated lists for the list identifiers that were not originally searched in step 24 and to transfer the new lists to the user's computer. The creation of new search terms may be done in the same manner as disclosed in the Cochran et al. patents, incorporated by reference herein. For instance, in the current example, after a search has been conducted based on search terms associated with list identifiers "Start of Travel", "Number of People", and "Location", updated lists of search terms would then be generated for each of the remaining list identifiers, "Lodging Type", "Lodging Name", "Amenities" and "Price".

In order to generate the correct lists at step 34, the computer program identifies the search terms contained in each record of the subset of records that has been generated from the first search 32. The search terms are placed into an alphabetical, chronological or numerical order and duplicate search terms are eliminated. The lists thus generated ensure that each search term will correspond to at least one record in existence in the subset of records. The formation of current or updated lists is further detailed in the Cochran, et al. patents, which have been earlier incorporated by reference.

The newly generated lists are transmitted back to the user's computer terminal 720. Default search terms from each of the new lists are displayed adjacent the associated list identifiers 36. The default search terms are the first search term of each list. In addition, the search terms that were searched at step 32 are displayed adjacent the associated list identifiers in order to indicate to the user which terms have been previously selected.

At step 38, the user may refine the search and reduce the subset of records to a smaller set by returning to step 14. At step 14, the user either accepts the new default search terms and conducts a new search 24 or views the additional lists 16 and selects additional search terms 18.

If the search is not continued at step 38, the user can view the selected records 40, 42 or chose to start over or end the session 44. Ending the session or starting over will result in the ID number, that was previously assigned at step 30, being relinquished 46, 48. If a new search is started, a new ID will be assigned.

The search terms that have already been used at step 24 cannot be changed without re-starting the system from the beginning. Accordingly, in the preferred embodiment, the user will not be able to view the list of search terms associated with the search terms that have already been searched at step 24. In this sense, the original search terms are fixed and cannot be modified.

For illustrative purposes, we will assume that the user decides to further refine the subset of records. As before, the user may display and select any additional lists of search terms 16, 18 available in the subset of records. The newly selected search terms will be displayed 20. The process of displaying and selecting search terms can be repeated any number of times.

At step 24, the user initiates a search of the subset of records using one or more newly selected search terms. The unique ID that had been previously assigned at step 30 is transmitted with the search request. At step 28, the database will recognize that a subset of terms has been created for the unique ID number. The database will then search the subset of records associated with the unique ID number 32 and a new subset of records will be constructed. The newly selected search term is used to search only the subset of records previously chosen so that the entire database need not be re-searched.

At step 34, new lists of search terms are formed based on the new subset of records. Default search terms for the new lists are displayed adjacent at least one new list identifier 36. The user continues at step 38 in the manner previously described.

Now turning to FIG. 3a, specific examples of the above-described generalized search system will be described making reference to the Travel Search™ embodiment. The initial Travel Search™ selection screen as seen by a user when a search is started is displayed on the user's display device 725 of a computer 720. In the preferred embodiment, seven index names or list identifiers 111–117 are displayed on the display device (step 12). In addition, default search terms 211–213 are displayed in rectangular pick boxes 311–313 located adjacent the first three list identifiers, Start of Travel 111, Number of People 112 and Location 113, respectively (step 11).

In the specific embodiment described, three list identifiers, and search terms associated with the three list identifiers, are required to be selected and the database searched for all three selected search terms simultaneously as will be described below. However, this is not required. As should be apparent, the system can be programmed to enable the initial search to be conducted after any predetermined number of search terms are selected.

The term "pick box" is used here to refer to the actual displayed box used to present the search terms. Pick boxes are standard elements of modern windowing technology. Pick boxes are spaces on the display that can be enlarged to display additional information and then "closed" to their original size and/or position.

At this point, the user may be satisfied with the three default search terms and may select the three defaults that are displayed next to the first three list identifiers 111–113 by activating Search "button" 500 (step 24). The search "button" is actuated by clicking on the button with a mouse-controlled cursor (not shown) in accordance with well known techniques.

Accordingly, if the user activates Search button 500, a search of the database will be conducted for the default search terms January–March 211, Disregard occupancy 212 and Within a City 213. As a brief aside, although certain terms, such as "Within a City", are characterized as search terms, they may not be the actual terms that are used to search the database. Rather, such terms merely lead to the search terms that will ultimately be searched, such as "Boston", as will be described below.

The default search terms 211–213 are predefined to be those terms that are most often used and most representative of the associated list identifier 111–113. Alternatively, the default terms may be the first search term in an alphabetical, numerical or chronological list of search terms. The default search terms may also be displayed as a blank space in the pick box.

Figure 3A:
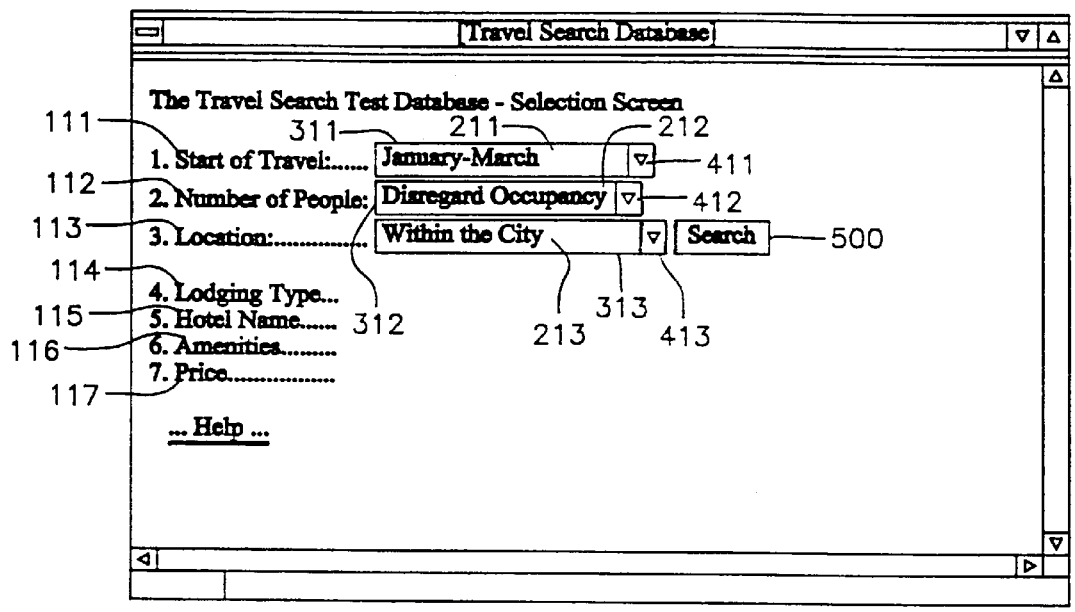
FIGS. 3a–3d illustrate a selection screen on a computer display device for selecting search terms used to search a database having travel information in accordance with a preferred embodiment of the present invention.

In FIG. 3a, pick boxes 311–313 are in a closed position. Each pick box 311–313, however, may be expanded to reveal a list of multiple search terms. A user may view each list of search terms and change any or all of the default search terms prior to conducting a search.

The pick boxes 311–313 may be selectively expanded by clicking on an expand field icon 411–413, respectively, with a mouse-controlled cursor or other selection device (not shown). The expand field buttons 411–413 are shown here as downward pointed arrows. Activation of the expand button 411–413 will open the associated pick box 311–313 and reveal a list of previously concealed search terms (step 16). A second activation of the expand button 411–413 will close the associated pick box 311–313 without the user selecting a search term. All of the available search terms for the list identifier are displayed in the expanded pick-box. If the expanded pick-box area is too small to display all of the available search terms, then scrolling is permitted within the confines of the expanded pick box. The expansion of pick boxes to enable display of a wide range of terms may be done in accordance with routine programming steps that are apparent to persons of ordinary skill in the computer programming arts.

Figure 3B:
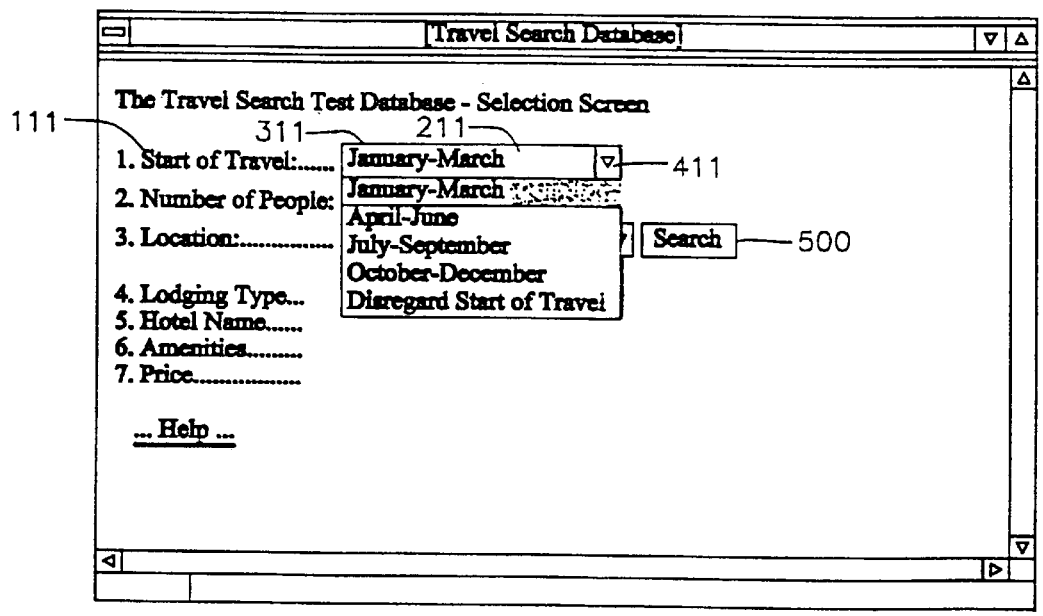

FIG. 3b shows a list of search terms 211 that is displayed if the user expands pick box 311 corresponding to the first list identifier 111, Start of Travel. Here, there are five search terms 211 to choose from: January–March, April–June, July–September, October–December and Disregard Start of Travel. The default search term, January–March is highlighted and placed in the select box in order to indicate the search term that will be selected if no other term is selected. If the user had previously selected a term during a previous viewing of the search terms, that term will be highlighted as the default term.

Once a pick box 311 has been expanded, a search term 211 may be selected by clicking on the desired search term 211 with the cursor (step 18). The expanded pick box 311 will then close, leaving the selected search term 211 visible on the display device (step 20). If the expand field icon 411 is activated without selecting a search term 211, pick box 311 will close, leaving the default search term, January–March visible on the display device, as shown in FIG. 3c.

Figure 3C:
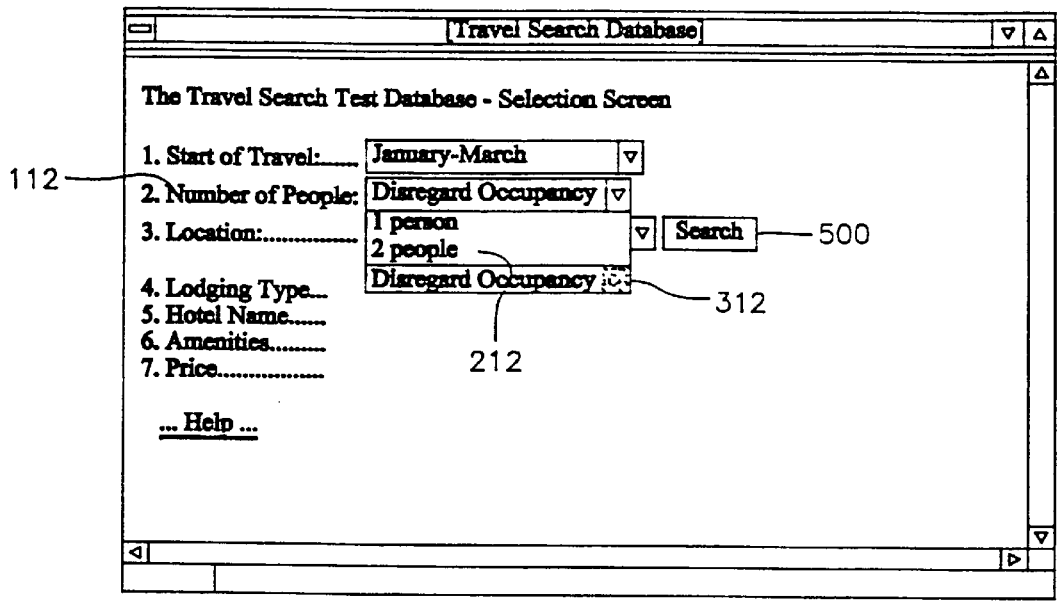

FIG. 3c shows a list of search terms 212 that is displayed if the user expands pick box 312 corresponding to the second list identifier 112, Number of People. Here, there are three search terms 212 to choose from: 1 person, 2 people and Disregard Occupancy.

Figure 3D:
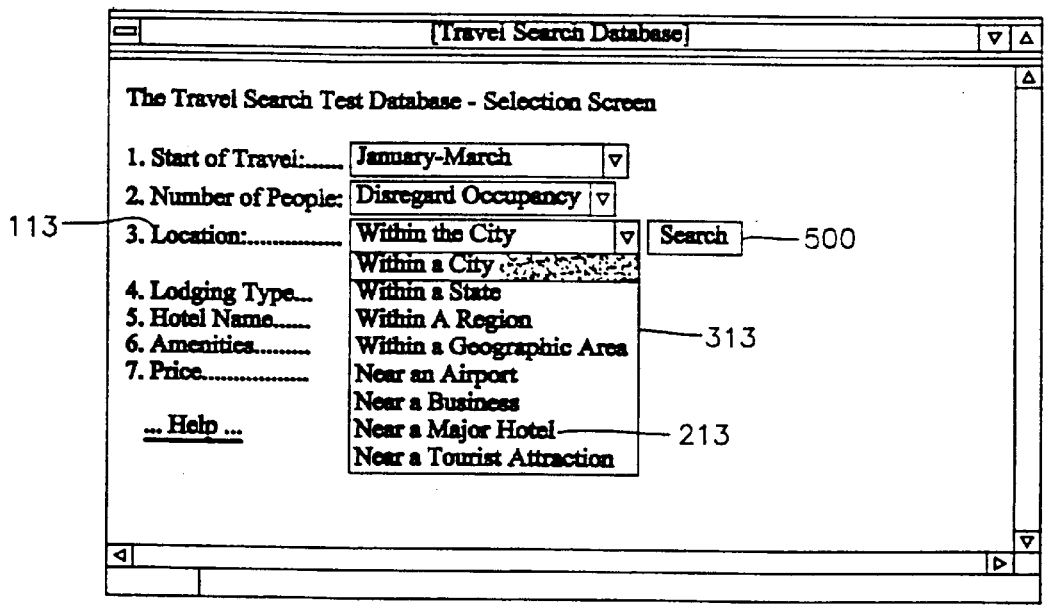

FIG. 3d shows the list of search terms 213 that is displayed if the user expands the pick box corresponding to the third list identifier 113, Location. Here, there are eight search terms 213 to choose from: Within a City, Within a State, Within a Region, Within a Geographic Area, Near an Airport, Near a Business, Near a Major Hotel and Near a Tourist Attraction.

When the user has selected three search terms 211–213 from each of Start of Travel 111, Number of People 112, and Location 113, the selections are transmitted to the database source, in this case by activating the search button 500 shown in FIGS. 3a–3d. A search of the database is made in accordance with standard techniques, such as described in Cochran et al. '648 and '949. The selected search terms 211–213 are used to identify a subset of records that meet the user's search criteria.

FIG. 3d is a good illustration of the principle that displaying a list of all available choices informs the user of available options before any search is initiated. A user may be able to accurately anticipate search terms such as City name and State. However, in the case of Location, it would be difficult for the user to know how this database was organized without the visual presentation in the expanded pick box 313. Likewise, other search terms 213, such as Near an Airport or Near a Tourist Attraction, would likely not otherwise be known by the user.

The display of the complete list of search terms informs the user of what search terms 211–213 are available. Accordingly, the user is best able to select the search terms that are most appropriate to the search. The search term lists effectively communicate all options to the searcher in a user-friendly manner that makes searching simple for even first-time searchers.

The displayed list of search terms further informs the user that there are no other search terms 211–213 available in the database. Because the user must select one of the search terms that are displayed, he or she will not try to create search terms that are not functional and that would otherwise yield a "dead end" if the database is searched. Accordingly, only search terms that are located in records of the database will be displayed in pick boxes 311–313. Based upon the absence of a desired search term, the user may decide to quit the search, or modify the search accordingly.

In the preferred embodiment of the present invention, a search term 211–213 from each of three list identifiers 111–113 will be used to search the database upon activating search button 500. However, as previously mentioned, it is not a requirement that search terms from three list identifiers be submitted on the first search. Rather, a single search term from one list may be sufficient. In the preferred embodiment, it is provided that three search terms can be selected and used to search at one time, because each and every combination of the three search terms that may be selected from list identifiers 111–113 will result in at least one record being selected.

When the user transmits a first search, the search query is assigned a unique ID designation (step 30) by the host server 710. The ID carries through the selection process for that particular search, keeping it separate from any other search that may be in process at the same time. The records are kept in a temporary file at memory 716 and identified by the unique ID code.

Three further decision paths will be examined as illustrative of the preferred embodiment of the invention. These situations are where the user selects Within a Region, Within a State and Within a City from the pick box 313 corresponding to the Location list identifier 113. In addition, when the example of Within a City is presented, two further possible decision paths will be examined: Bossier City, La. and Boston, Mass. The Boston, Mass. path will be examined through an additional level of selection.

Selecting Within a Region

Figure 4A:
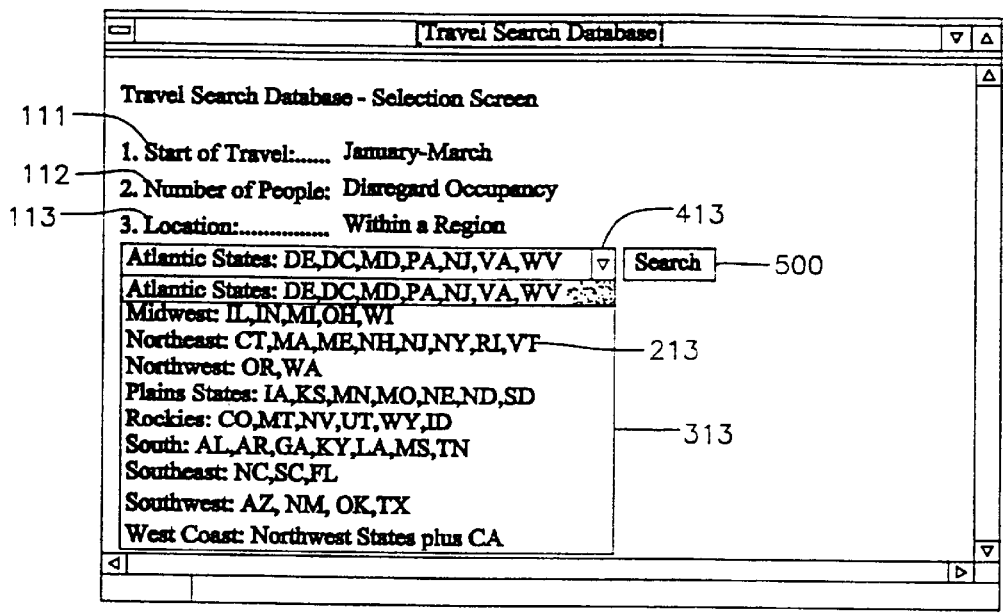

FIG. 4a shows the display that appears if the user selects the default search terms 211 January–March and Disregard Occupancy 212 for the list identifiers Start of Travel 111 and Number of People 112, respectively. The user then selects the search term 213, Within a Region, for the Location list identifier 113, from pick box 313 of FIG. 3d.

Upon selecting Within a Region, pick box 313 displays a subcategory of ten search terms 213 corresponding to regions of the United States, as shown in FIG. 4a. The pick box for the subcategory may be closed by clicking on the expand button 413, so that the system returns to the prior pick box selection.

If the user selects Atlantic States and then activates the Search button 500, the search query is transmitted to the database (step 24). A unique ID number is assigned at step 30 and the database is searched for records matching the criteria specified in the search query (step 32).

Figure 4B:
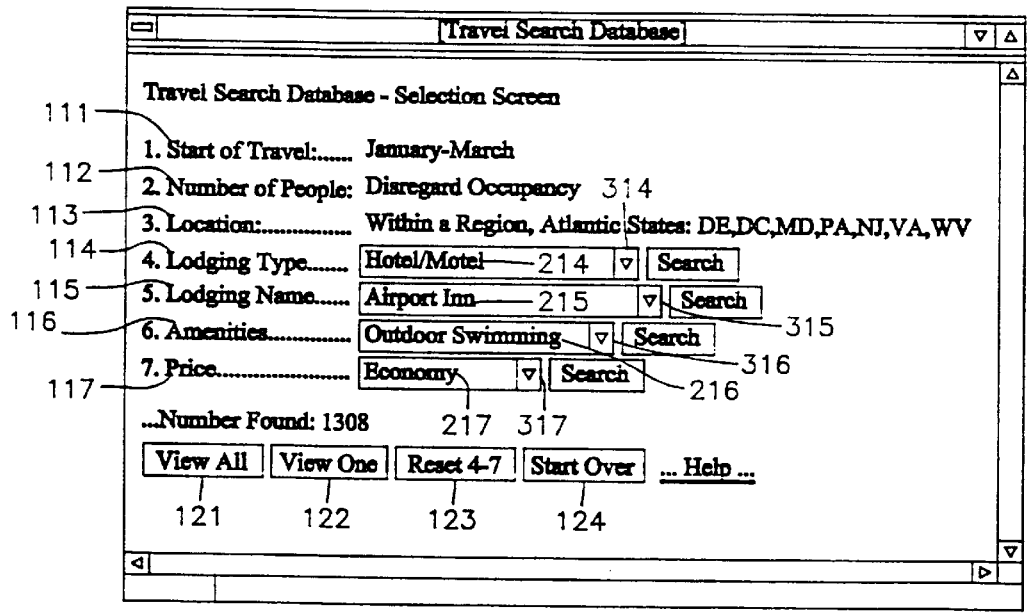

In response to the search, a display like FIG. 4b appears on the display device. The search terms that have already been selected and searched are no longer located in pick boxes. That is, searched terms January–March 211, Disregard Occupancy 212, and Within a Region, Atlantic States 213, are displayed on the display device, but are not located within pick boxes. Consequently, the lists for list identifiers 111–113 can no longer be viewed and new search terms may not be selected from these list identifiers unless the user starts over (step 48).

As a further result of the search, updated lists of search terms have been created for the remaining list identifiers 114–117 (step 34). Accordingly, default search terms 214–217 are displayed in pick boxes 314–317 for the remaining four list identifiers 114–117, Lodging Type, Lodging Name, Amenities and Price, respectively (step 36). In addition, the display indicates that 1,308 records are located in the subset of records at display portion 118. The number of records in the subset is illustrated in FIG. 4b by the phrase "Number Found: 1308". However, the step of displaying the number of records in the subset is optional, and not a requirement of the invention.

At this point, four options are presented at the bottom of the display screen. The first option is to view the entire subset of records that were located by activating the View All button 121. The View All button presents the entire subset of records to the user. Part of a record is shown in FIG. 4c. The user may scroll the screen to view the records, advance one screen at a time, or go directly to the top or bottom of the records by activating a First Record button or Last Record button, respectively. A second option is to view a single record located in the search by activating the View One button 122. The View One button will enable the user to select one record from a list of the available records and view only that record. There are many established ways of viewing records from a database, and any conventional method can be applied at the end of the selection process that forms the present invention.

A third option is to reset the search terms selected for list identifiers 114–117 by selecting the Reset 4–7 button 123. The Reset 4–7 button will clear any search terms previously selected for list identifiers 114–117 and replace them with default terms 214–217.

The final option at the bottom of the screen is for the user to restart the selection process from the beginning by activating the Start Over button 124. The Start Over button 124 will reset the system back to the beginning display of FIG. 3a by relinquishing the unique ID (step 48) and returning to the initial step 12. The four option buttons 121, 122, 123 and 124 are only illustrative of the preferred embodiment.

Alternatively, the user has the option of further reducing the subset of records by further limiting the search. It is at this point that the present embodiment best illustrates the implementation of the unique feature of the present invention. The detailed explanations that follow illustrate that the user can examine several lists before making a decision about how to proceed. The user can see choices in multiple lists before deciding which search term from which list best meets their interest. In the description that follow, the search process is not hierarchial. Rather, any list identifier can be selected by the user first. Likewise, the remaining list identifiers, can be selected in any order desired by the user, or not selected at all.

To reduce the subset of records, the user may select a search term 214–217 from at least one list associated with any one of the list identifiers 114–117. Pick boxes 314–317 can be expanded one after another so that the user may view all search terms that are available in the subset of 1,308 records (step 16). All the search terms 214–217 that can be selected for list identifiers 114–117 are available to the user at this point (steps 16, 18). The user may also select the default search terms 214–217 that are displayed adjacent each list identifiers 114–117 (step 14).

FIG. 4d shows the list of 12 search terms available for the list identifier 114, Lodging Type, when the user selects Atlantic States as the Region in FIG. 4a. It should be noted that there may be additional Lodging Types in the total database. However, only the search terms that are available in the identified subset are displayed. Accordingly, the user may only select Lodging Types that will result in a "hit" when the database is actually searched.

Figure 4E:
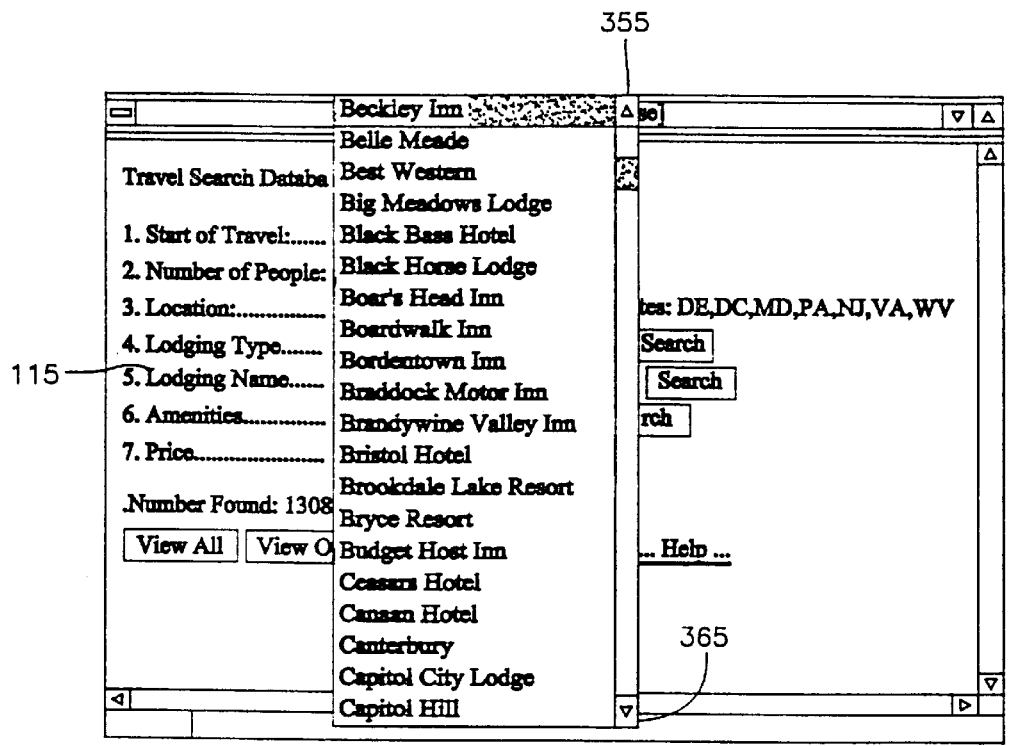

FIG. 4e shows part of the list of search terms 215 available for the list identifier 115, Lodging Name, when the user selects Atlantic States as the Region in FIG. 4a. Only a portion of the list is displayed at any given time since there are more Lodging Names in the subset than can fit on the display screen simultaneously. In the embodiment shown, the names are displayed alphabetically from Beckley Inn through Capitol Hill. Names that come before Beckley Inn and after Capitol Hill can be displayed by scrolling the pick box with scroll keys 355, 365, respectively.

Figure 4F:
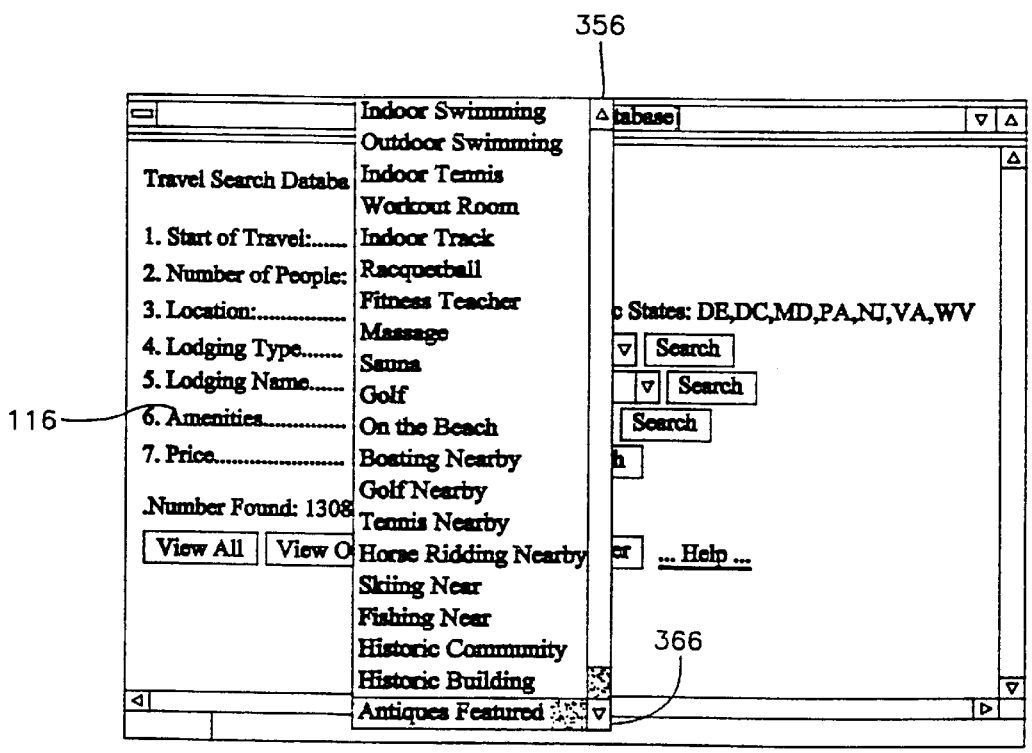
Figure 5A:
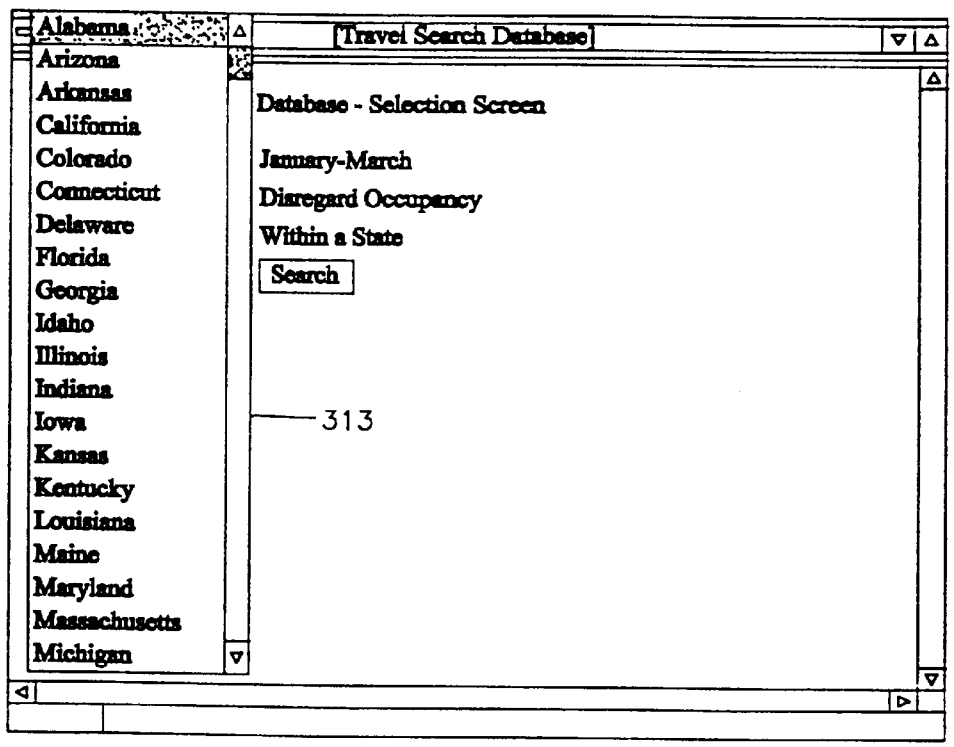

Now turning to FIG. 4f, a list is shown of search terms available for the list identifier 116, Amenities, when the user selects Atlantic States as the Region as shown in FIG. 5a. There may be other Amenities in the overall database but they are not displayed because they are not available choices. This list can also be scrolled to display additional search terms by activating scroll buttons 356, 366.

Figure 4G:
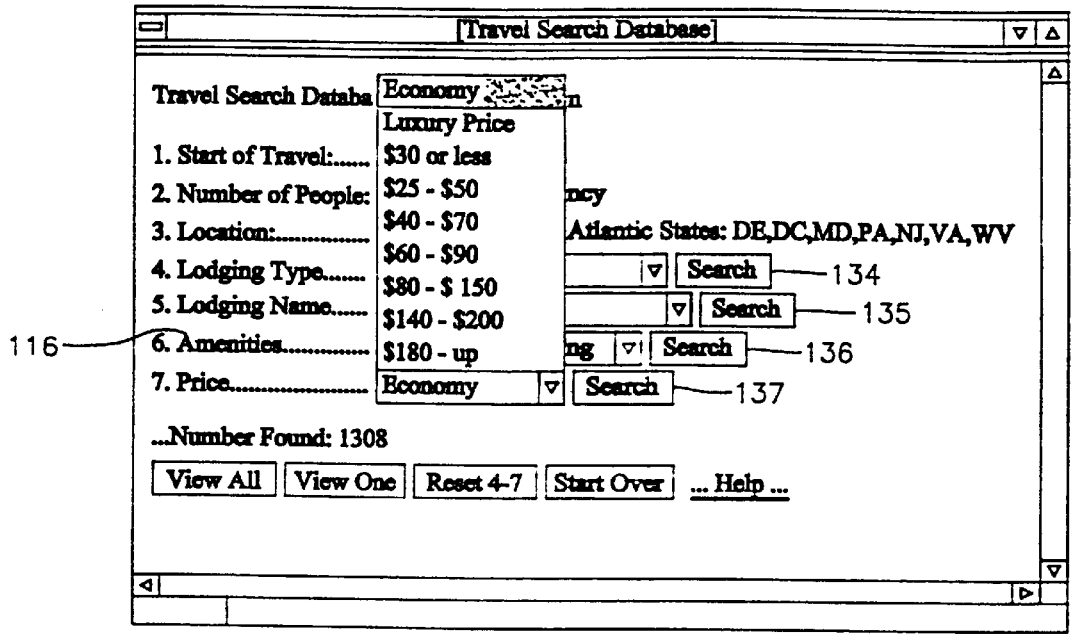

Last in this series, FIG. 4g shows the list of nine search terms available for Price, when the user selects Atlantic States as the Region at FIG. 4a. The list begins with Economy and Luxury and are followed by seven price ranges.

The four lists of search terms shown in FIGS. 4d–4g are each available until the user selects a search term from one of list identifiers 114–117 and then activates one of Search buttons 134–137, respectively. The user can examine the lists of search terms in any order and as many times as needed, without there being another transmission between the display device and the database source. No hierarchial order of selection is required.

After the user selects one search term 214–217 and activates the associated search button 134–137, a search query will be transmitted to the server 710 with the unique ID number (steps 28, 32). The server 710 will search the subset of records for one additional term that is specified by one search button query 134–137.

All searches described below allow for only one search term to be selected at a time. For instance, suppose the search term Golf is selected for the list identifier Amenities 116, and search button 136 is activated. The database will search the subset of records for the term golf. The user cannot use multiple search terms to conduct a search since there would be no assurance that a "hit" would take place. The system can be programmed to permit multiple search term searches only where there is a certainty that the multiple search term search will result in a "hit", such as described above with respect to the first search.

The lists of search terms illustrated in FIGS. 4d–4g were for the situation where the user selected January–March, Disregard Occupancy and Within a Region, Atlantic States. For any other combinations of search terms in the list identifiers 111–113, the available search terms would be different, as will be illustrated below.

Selecting Within a State

If the user selects January–March, Disregard Occupancy and Within a State, instead of Within a Region, FIG. 5a appears on the display device. State names are available for selection in pick box 313. Additional state names can be displayed by scrolling the pick box 313.

If the user selects Delaware, one of the states included in the Region, Atlantic States in the previous example, display FIG. 5b would appear. The number of records found by searching Delaware is 26, rather than 1,308 that were located for the entire Atlantic States Region. Option buttons 121–124 present options for proceeding without narrowing the search and are the same as when the entire Atlantic Region was selected, as discussed in relation to FIG. 4b above.

In the current illustration, three of the default search terms remain the same for both the Atlantic States Region and Within a State, Delaware. However, for Delaware, Lodging Name 115 has a default term of Addy Sea 215. Whereas, Atlantic states has a default term of Airport Inn (FIG. 4b).

Continuing with Within a State, the list of search terms transmitted to the display device has changed to reflect only what is actually available in Delaware. FIG. 5c shows 3 Lodging Types: Hotel/Motel, Waterfront, and Inn or Country Lodge. When the Atlantic States Region was selected, there were 12 Lodging Types, as shown in the embodiment of FIG. 4d.

Figure 5D:
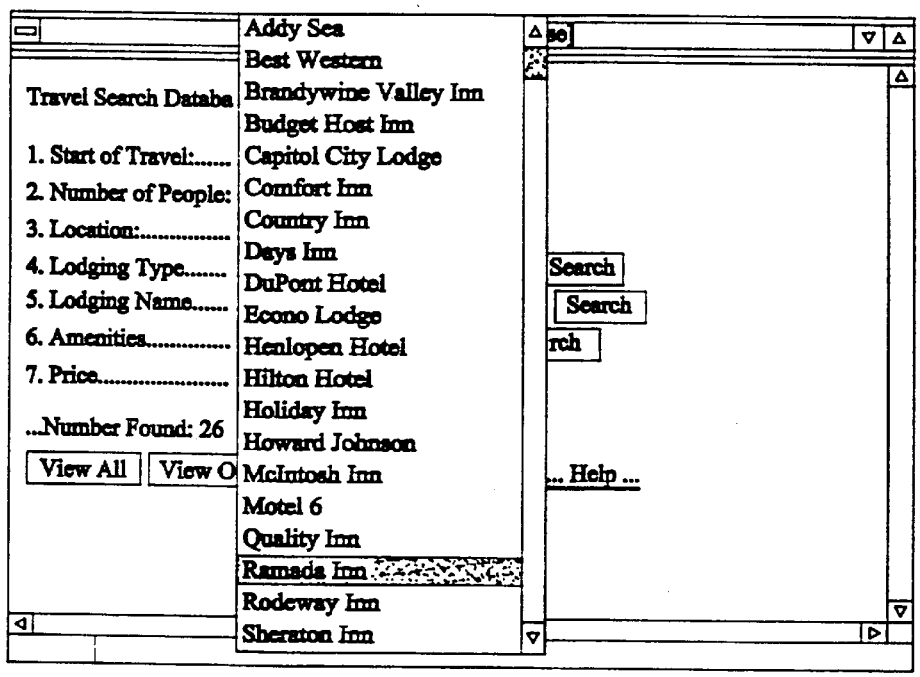

FIG. 5d shows a list of Lodging names in Delaware. This pick box 315 also scrolls. The list does not include all the Lodging Names in the Atlantic States Region shown in FIG. 4e. Yet, because Delaware is a subset of the Atlantic States, the Atlantic States Region does include all the Lodging Names in Delaware. Four of them, Best Western, Brandywine Valley Inn, Budget Host Inn and Capitol City Lodge appear in both displays because they are in both subsets.

Figure 5E:
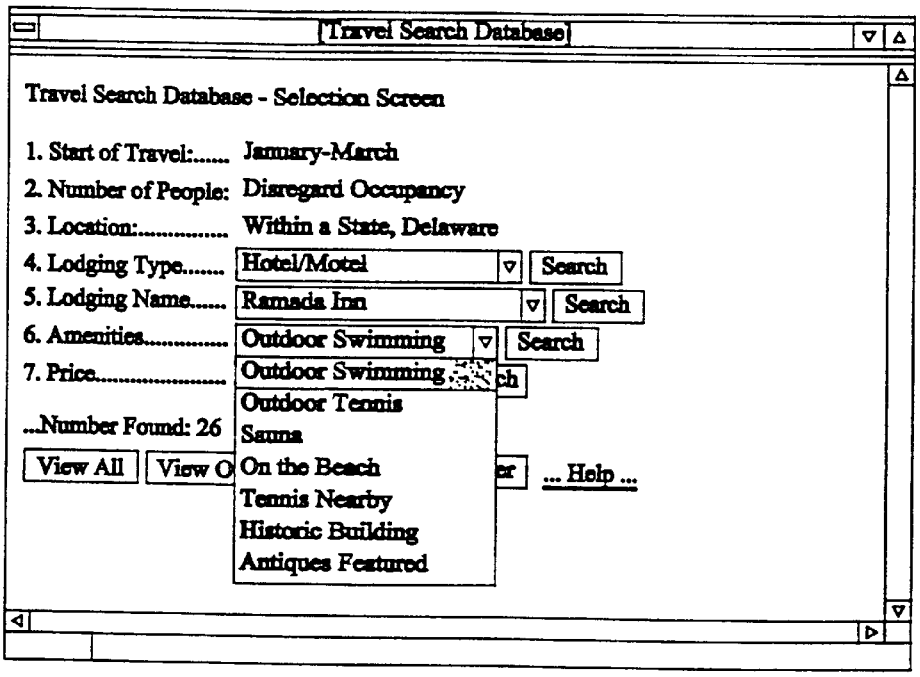

FIG. 5e shows 7 Amenities available in Delaware, compared to the larger number in the Atlantic States Region, shown in FIG. 4f. Likewise, FIG. 5f shows 8 Prices available in the database if the user selected the State of Delaware, compared to 9 for Atlantic States of FIG. 4g.

The displays of lists of search terms that are generated for the two situations, Within a Region and Within a State differ because the choices that are actually available differ. As noted previously, only choices that lead to a "hit" are transmitted to the users display device. Users never find themselves in the position where there are no records that meet the criteria they select. The characteristic of being able to choose search terms from lists without regard for a predetermined hierarchy, prevails in the example of Within a State, as it did for Within a Region, and as it will in the examples that follow.

Selecting Within a City

FIG. 6a shows the screen display that appears if the user selects January–March at Start of Travel, Disregard Occupancy at Number of People, Within a City at Location and then activates the Search button 500 at FIG. 3a. The choices that have been made are reflected on the screen display adjacent list identifiers 111–113. The user is instructed to interact with the computer by typing part of a city name at input box 600 and activating the Enter button 610.

Typing fields are not a requirement of the invention. In this case, however, it is an efficiency because almost 4,000 city names are available in the Travel Search database. The typing field limits the search terms transmitted. The program actually functions without limiting the list through the user of a typing field. If the user selected Enter without typing anything in the typing field, all city names are transmitted to the user's display device.

FIG. 6b shows a case where a user typed three letters, "bos" in input box 600 and activated Enter button 610. A search of the database is then conducted and the search results are displayed in a pick box. In this example, two choices are returned to the user: Bossier City, La. and Boston, Mass., as shown in FIG. 6c. These are the only city names in the database starting with "bos." Each choice will be examined in turn.

Selecting Bossier City, La.

If the user selects Bossier City, La. from FIG. 6c and then activates the Search button 500, FIG. 7a appears. Default terms 214–217 are displayed in pick boxes located adjacent list identifiers 114–117. Display portion 118 indicates that 10 records have been located.

FIG. 7b shows the list of search terms available for the list identifier, Lodging Type, when the user, working with Bossier City, La. expands the pick box 315 corresponding to list identifier 115, Lodging Type. There are 2 choices: Hotel/Motel and Suite Hotel.

FIG. 7c shows the list of search terms available for the list identifier, Lodging Name. There are 10 choices, beginning with Airline Motor Inn. Likewise, FIG. 7d shows the list of search terms available for the list identifier, Amenities. There are three: Outdoor Swimming, Workout Room and Sauna. And last in this series, FIG. 7e shows the list of six search terms available for Price. The search terms begin with Economy and are followed by five price ranges.

These four sets of search terms are all available to the user until the user makes a selection and activates one of the Search buttons 134–137, or chooses one of the options 121–124 at the bottom of the screen.

Selecting Boston, Mass.

As an alternative, if Boston, Mass. is selected from FIG. 6c, rather than Bossier City, La., the available search terms are different, as shown in FIG. 8a. The layout of the display is the same as the display for Bossier City, La. Here, however, seventy-three records were identified as opposed to ten records shown in FIG. 7a for Bossier City, La.

FIG. 8b shows that, for Boston, Mass. there are five search terms for Lodging Type rather than the two found for Bossier City, La. and shown in FIG. 7b. In addition, FIG. 8c shows the list of search terms available for the list identifier, Lodging Name. The pick box can be scrolled to see the beginning and the end of the list. On the other hand, only 10 names that were displayed in FIG. 7c for Bossier City, La.

Figure 8D:
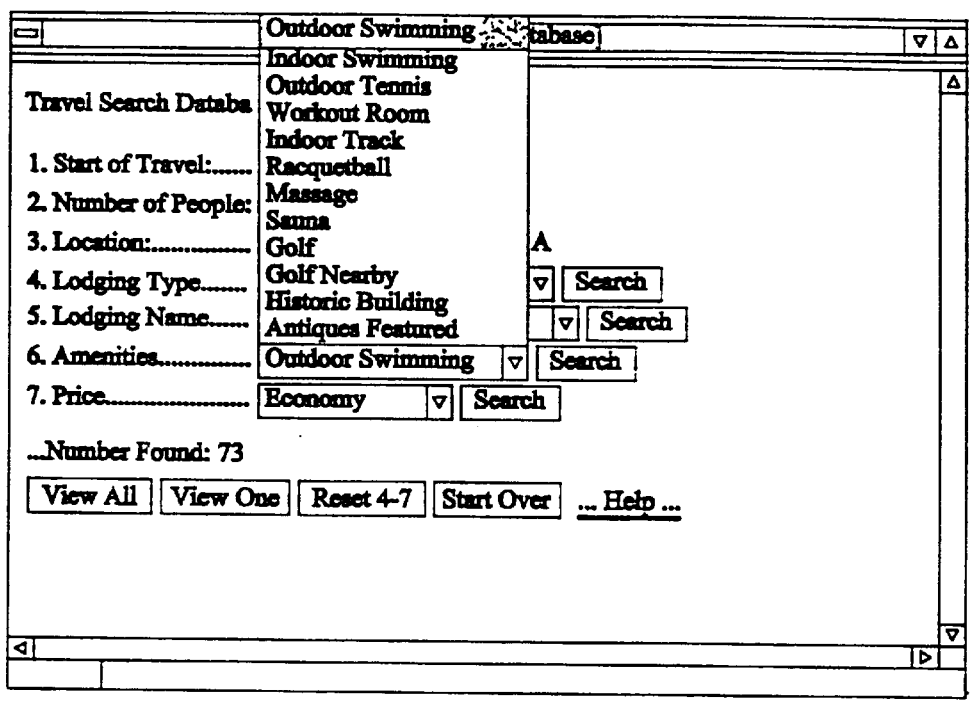
Figure 8E:
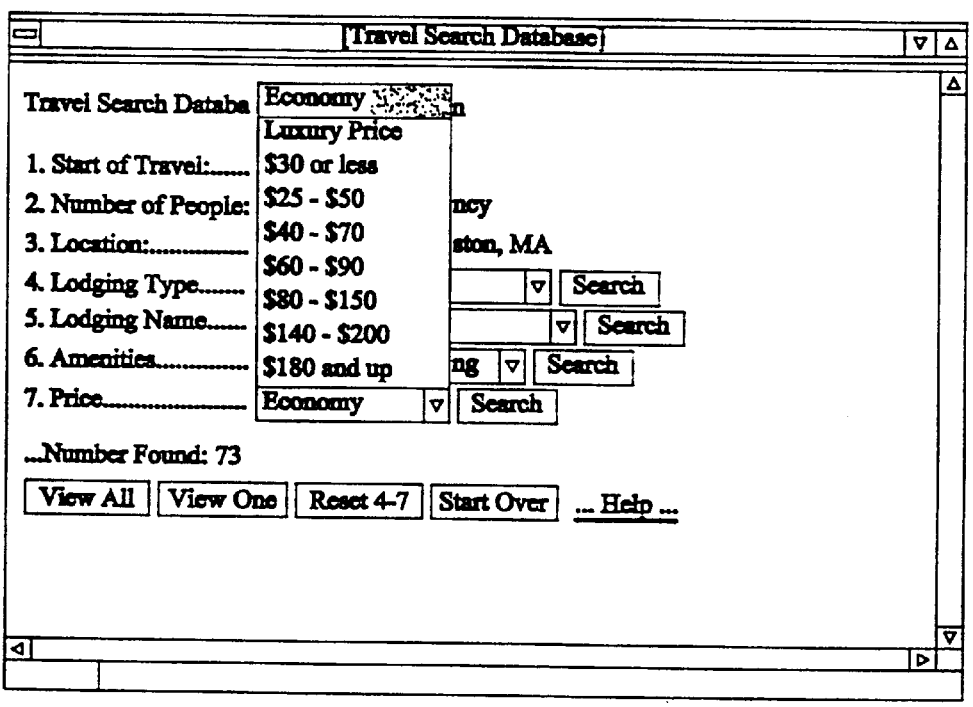

FIG. 8d shows a list of 12 search terms available for the list identifier, Amenities, as compared to three for Bossier City, La., as shown in FIG. 7d. And last, FIG. 8e shows the list of search terms available for Price in Boston, Mass. The list begins with Economy, as did the Price list for Bossier City, but contain nine choices rather than six.

To review an efficiency gained by the invention, lists that are displayed never include search terms that are not available after taking into account choices that have already been made. Choices may be very similar to one-another or may be very distinct. However, the choices will always be functional in the interaction that is created when a user accesses a particular database to complete a particular search for information. Therefore, the user will never make a choice that wastes search time. A user will never be allowed to go forward and reach a dead-end.

Selecting Economy in Boston, Mass.

After looking at the search terms available in the four list identifiers for Boston, Mass. and deciding to narrow the selection so that the subset of selected records more closely matches the user's needs. The user may use any list. The user decides which list to use by looking at the lists of search terms in all available lists and choosing one search term from one list. In this illustration, the user selects Economy from the Price list.

The result for this search appears in FIG. 9a. The display shows that when Economy is selected, 13 records are in the subset and that there are still 3 list identifiers 114–116 that can be used to narrow the search. If the search could not be further limited, pick boxes 314–316 would not have appeared for the remaining list identifiers. In an alternative embodiment, the list identifiers that cannot be used to further narrow the search may be omitted or replaced with other list identifiers.

One additional decision level will be expanded to further illustrate how the display of search terms before a decision is made can help manage a users decisions about how to proceed. FIG. 9b shows that there is now only one choice at Lodging Type: Hotel/Motel, instead of the 5 choices available in Boston, Mass. before Economy was chosen (FIG. 8b). However, since there is only one option for Lodging Type, the pick box may be omitted. Nonetheless, a pick box is used in the preferred embodiment so that the user will recognize that there is only one option of Lodging Type.

Figure 9C:
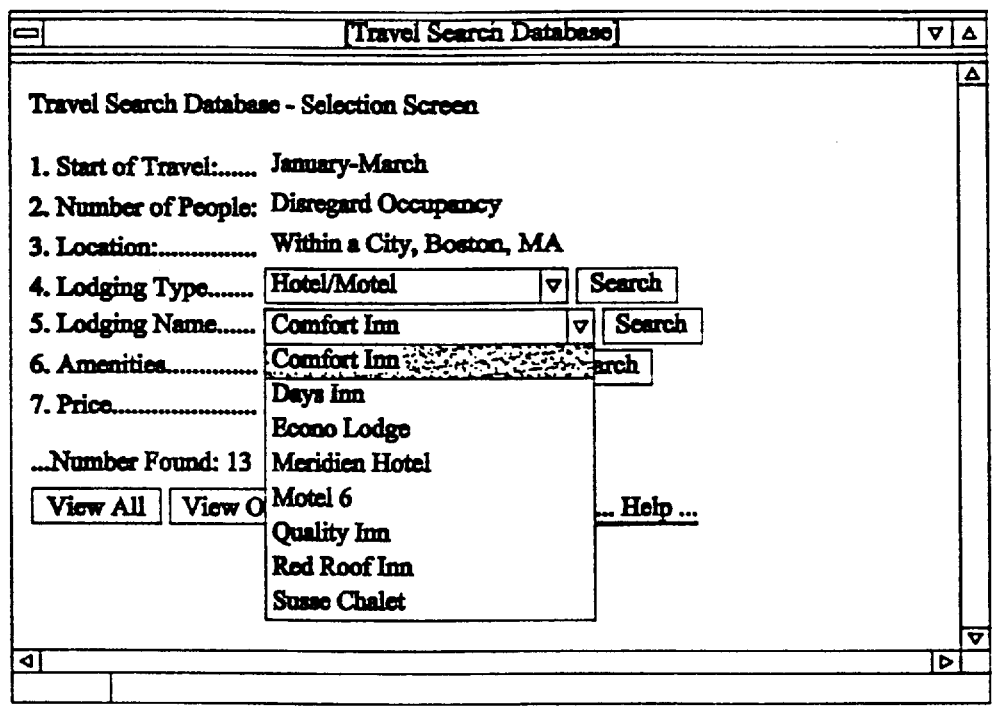
Figure 9D:
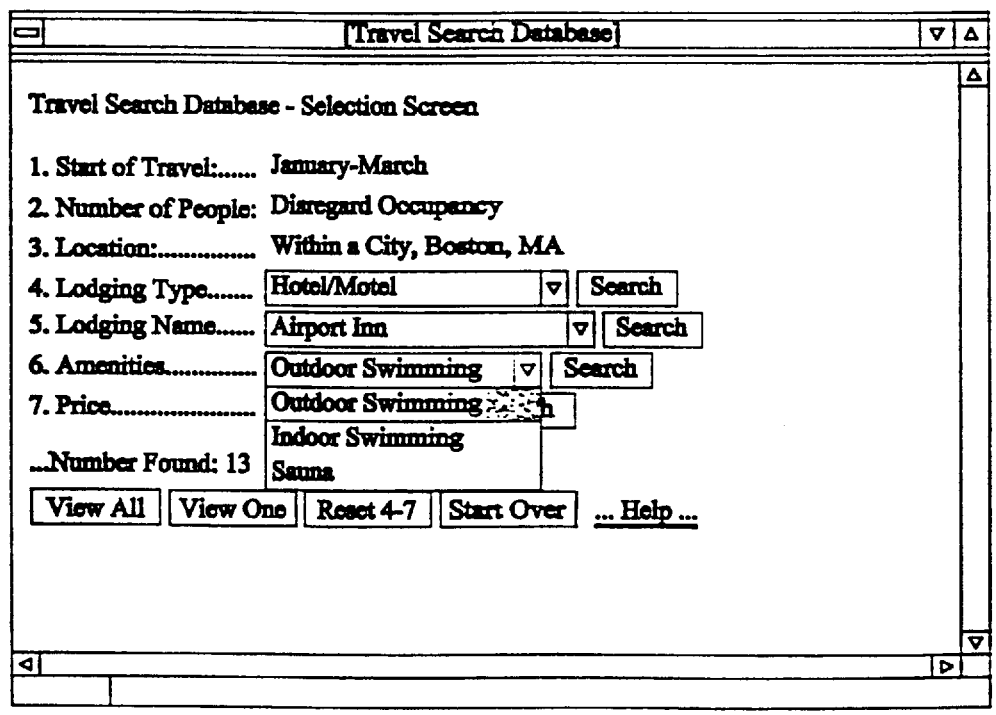

FIG. 9c shows 8 choices at Lodging Name, instead of the large number available in Boston before the selection was narrowed to Economy (FIG. 8c). And last in the series, FIG. 9d shows the 3 Amenities available instead of the 12 that were available in Boston, Mass. before Economy was selected (FIG. 8d).

In summary, being able to examine lists of choices before making a decision increases the precision of database selection. The determination of which list to use cannot be made unless the user has access to all available lists before starting the search. With that information, the user can direct the search so that it is as effective as possible. The present invention allows lists of search terms in multiple categories to be viewed before any selection is made that reduces the database to a subset of records.

FIGS. 10a–10b show two alternative ways to display list identifiers and search terms. In FIG. 10a, list identifiers appear on the top row of a four column display of search terms. To make a selection, a user would highlight a search term and click the Search button. The next display of search terms would be a subset of all the search terms originally available.

In FIG. 10b, the list identifier is implied by the title and display of the pick boxes, each containing a default search term. The default terms shown in the pick boxes provide enough information for the user to know what kind of information is contained in each list. A choice is made by looking at the lists in the pick boxes, selecting a search term, and clicking the associated Search button.

The foregoing descriptions and drawings should be considered as illustrative only of the principles of the invention. Numerous applications of the present invention will readily occur to those skilled in the art. For example, the pick boxes may be located such that when a particular pick box is expanded, it will not cover any of the terms of the remaining pick boxes. Accordingly, two pick boxes could be opened simultaneously so that, for instance, a user could examine the regions offered, as well as the particular states. However, once a search term was selected in one pick box, the search terms displayed in the other pick box would necessarily change.

In addition, more than a single pick box may correspond with a given list identifier and separated by boolean functions located in an operator box. In this manner, more than a single search term may be specified for a given list identifier, and connected with a boolean operator. For example, the user may search either Virginia or Maryland for the Within a State list identifier, in conjunction with one or more search terms selected from the remaining list identifiers. However, single search terms are preferred since it ensures that the search will result in at least one record. Searching multiple search terms at once, on the other hand, may result in no records being found in the database.

Therefore, it is not desired to limit the invention to the specific examples disclosed or the exact construction and operation shown and described. Rather, all suitable modifications and equivalents may be resorted to, falling within the scope of the invention.

I claim:

1. A method for enabling the non-hierarchal searching and retrieval of information from records stored at an Internet server via a user's computer having a display device and a manually operable input device for inputting commands to access, retrieve, and display the information, the method comprising the steps of:

creating, at said server, a plurality of lists of search terms formed from words, symbols, or phrases, each search term list corresponding to one of a plurality of categories of information;

programming the server to enable the forwarding, to said user's terminal, of search terms associated with each of the plurality of categories;

programming the server to enable the selection of at least one of said search terms from any of the forwarded lists of search terms;

programming the server to search all of the available records in the server to identify records corresponding to said selected search term;

programming the server to enable the creating of at least one new list of search terms from the identified records in response to said searching of records; and, programming the server to forward, to said user's terminal, search terms associated with said at least one new list of search terms.

2. A method for enabling the non-hierarchal searching and retrieval of records of information stored in a computer database of a computer via a display device and an input device, the method comprising the steps of:

creating a plurality of lists of search terms formed from words, symbols, or phrases, each search term list corresponding to one of a plurality of categories of information in the computer database;

programming the computer to enable a user to display simultaneously, on said display device, multiple search terms of at least one of said plurality of lists of search terms;

programming the computer to enable the user to vacate the display of search terms and to display simultaneously on said display device, multiple search terms of a different at least one of said plurality of lists of search terms;

programming the computer to enable the user to select, through the input device, one of said search terms from any of the lists of displayed search terms;

programming the computer to search all of the available records in the database to identify records responsive to said selected search term; and, programming the computer to enable the user to display, on said display device, the identified records.

3. A method for enabling the non-hierarchal accessing of records, stored in a computer database, in response to commands receivable from a user terminal and for retrieving and forwarding records to the user terminal, the method comprising the programming of the computer to perform the following steps in response to commands receivable from the user's terminal:

creating a plurality of lists of search terms, each search term list corresponding to one of a plurality of categories of information in the computer database;

forwarding said plurality of lists of search terms to the user terminal;

receiving a selected search term command from the user terminal indicating a selected search term;

creating a plurality of new lists of search terms in response to the selected search term command, each new list having search terms associated with records containing the selected search term;

forwarding said plurality of new lists of search terms to the user terminal;

receiving a selected new search term command from the user terminal;

retrieving records from the database in response to the received selected new search term command; and, forwarding said retrieved subset records to the user terminal.

4. The method of claim 3, wherein the computer database is located at a remote location from the user terminal.

5. The method of claim 3, wherein the computer database is accessed via the Internet.

6. The method of claim 3, wherein the computer database is integral with the user terminal.

7. The method of claim 3, further comprising creating list identifiers associated with each of said lists of search terms, wherein said step of forwarding further comprises forwarding said list identifiers to the user terminal.

8. A method for enabling the non-hierarchal retrieval of information from records stored at an Internet server via a user's terminal having a display device and a manually operable input device for inputting commands to access, retrieve, and display the information, the method comprising the steps of providing program instructions at the Internet server to perform the following steps in response to commands from the user's terminal:

creating, at said server, a plurality of list-identifiers, each list-identifier identifying a category of information;

creating, at said server, a plurality of lists of search terms formed from words, symbols, or phrases, each search term list corresponding to one of said list-identifiers;

forwarding said plurality of list-identifiers and said plurality of lists of search terms to said user's terminal to enable the display device to display said plurality of list-identifiers, to simultaneously display a list of multiple search terms associated with each of the list-identifiers, to enable the user to select one of said search terms from any of the lists of displayed search terms, and to enable the user's terminal to forward said selected search term to said server;

searching all of the available records in the server to identify records corresponding to said selected search term;

creating, at said server, at least one new list of search terms in accordance with said searching for records;

forwarding the at least one new list of search terms to said user's terminal to enable the display device to display said at least one new list of search terms, said at least one new list of search terms associated with at least one of said list-identifiers, to enable the user to select one of the search terms from said at least one new list of displayed search terms, and to enable the user's terminal to forward the selected search term to said server; and, searching for records in the server corresponding to the selected search term from the new list of displayed search terms.

9. A system for non-hierarchal retrieval of records stored at an Internet server and for transferring the retrieved records to a user terminal, including a display screen and a manually-operable input unit, in response to commands receivable by the computer system from the user terminal, the system comprising:

a server including a database having a plurality of records and means for accessing the records in accordance with a set of computer program instructions and in response to commands received from the user terminal, said computer program instructions including:

(a) means for creating a plurality of list-identifiers, each list-identifier identifying a particular category of information;

(b) means for creating a plurality of lists of search terms derived from available records stored in the database memory, each search term list corresponding to one of said list-identifiers;

(c) means responsive to a command from the user terminal for transferring the plurality of list-identifiers, from means (a), and the lists of search terms, from means (b), to the user terminal;

(d) means for enabling the user terminal to simultaneously display each of said list-identifiers, transferred by means (c), on the display screen and to simultaneously display a list of multiple search terms associated with each of the list-identifiers, transferred by means (c), on the display screen;

(e) means for enabling the user terminal, in response to a command from the input device, to select a search term from any of the lists of search terms displayed on the display screen by means (d); and, (f) means, responsive to means (e), for determining if a search term has been selected by the user terminal and, if selected, for searching the available records of the database for records responsive to the selected search term, for creating an updated plurality of lists of search terms from the responsive records, and for transferring the updated plurality of lists of search terms to the user terminal.

* * * * *